(12) United States Patent
Tucker et al.

(10) Patent No.: US 10,589,479 B2
(45) Date of Patent: *Mar. 17, 2020

(54) COLORED HYDROGEL CONTACT LENSES WITH LUBRICIOUS COATING THEREON

(71) Applicant: Novartis AG, Basel (CH)

(72) Inventors: Robert Carey Tucker, Suwanee, GA (US); John Dallas Pruitt, Suwanee, GA (US); Yongxing Qiu, Suwanee, GA (US)

(73) Assignee: Alcon Inc., Fribourg (CH)

( * ) Notice: Subject to any disclaimer, the term of this patent is extended or adjusted under 35 U.S.C. 154(b) by 113 days.

This patent is subject to a terminal disclaimer.

(21) Appl. No.: 15/704,188

(22) Filed: Sep. 14, 2017

(65) Prior Publication Data

US 2018/0079157 A1 Mar. 22, 2018

Related U.S. Application Data

(60) Provisional application No. 62/396,844, filed on Sep. 20, 2016.

(51) Int. Cl.
| | |
|---|---|
| G02B 1/04 | (2006.01) |
| B29D 11/00 | (2006.01) |
| C09D 177/00 | (2006.01) |
| G02C 7/02 | (2006.01) |

(52) U.S. Cl.
CPC .. *B29D 11/00067* (2013.01); *B29D 11/00038* (2013.01); *B29D 11/00125* (2013.01); *B29D 11/00317* (2013.01); *C09D 177/00* (2013.01); *G02B 1/043* (2013.01); *G02C 7/021* (2013.01); *B29D 11/00903* (2013.01); *C08J 2433/08* (2013.01)

(58) Field of Classification Search
CPC .................................................. G02B 1/043
See application file for complete search history.

(56) References Cited

U.S. PATENT DOCUMENTS

| | | |
|---|---|---|
| 3,408,429 A | 10/1968 | Wichterle |
| 3,536,386 A | 10/1970 | Spivack |
| 4,347,198 A | 8/1982 | Ohkada et al. |
| 4,444,711 A | 4/1984 | Schad |
| 4,460,523 A | 7/1984 | Neefe |
| 4,460,534 A | 7/1984 | Boehm et al. |
| 4,558,931 A | 12/1985 | Fuhrman |
| 4,582,402 A | 4/1986 | Knapp |
| 4,704,017 A | 11/1987 | Knapp |
| 5,034,166 A | 7/1991 | Rawlings et al. |
| 5,352,714 A | 10/1994 | Lai et al. |
| 5,461,433 A | 10/1995 | Nakabayashi et al. |
| 5,508,317 A | 4/1996 | Mueller |
| 5,583,163 A | 12/1996 | Mueller |
| 5,583,463 A | 12/1996 | Merritt |
| 5,789,464 A | 8/1998 | Mueller |
| 5,843,346 A | 12/1998 | Morrill |
| 5,849,810 A | 12/1998 | Mueller |
| 5,894,002 A | 4/1999 | Boneberger et al. |
| 6,164,777 A | 12/2000 | Li et al. |
| 6,218,508 B1 | 4/2001 | Kragh et al. |
| 6,303,687 B1 | 10/2001 | Mueller |
| 6,627,124 B1 | 9/2003 | Herbrechtsmeier et al. |
| 6,800,225 B1 | 10/2004 | Hagmann et al. |
| 7,384,590 B2 | 6/2008 | Kelly et al. |
| 7,387,759 B2 | 6/2008 | Kelly et al. |
| 8,529,057 B2 | 9/2013 | Qiu et al. |
| 8,557,334 B2* | 10/2013 | Samuel ................. G02B 1/043 351/159.33 |
| 2001/0050753 A1 | 12/2001 | Tucker |
| 2002/0080327 A1 | 6/2002 | Clark et al. |
| 2002/0133889 A1 | 9/2002 | Molock et al. |
| 2003/0085934 A1 | 5/2003 | Tucker et al. |
| 2003/0119943 A1 | 6/2003 | Tucker et al. |
| 2003/0184710 A1 | 10/2003 | Tucker |
| 2004/0001181 A1 | 1/2004 | Kunzler et al. |
| 2004/0116564 A1 | 6/2004 | Devlin et al. |
| 2006/0114409 A1 | 6/2006 | Kunzler et al. |
| 2012/0026457 A1* | 2/2012 | Qiu ........................ G02B 1/043 351/159.33 |
| 2012/0026458 A1 | 2/2012 | Qiu et al. |
| 2012/0314185 A1 | 12/2012 | Bauman et al. |
| 2013/0118127 A1 | 5/2013 | Kolluru et al. |

(Continued)

FOREIGN PATENT DOCUMENTS

| | | |
|---|---|---|
| AU | 2015201805 A1 | 4/2015 |
| DE | 102008014498 A1 | 9/2009 |
| EP | 1465931 B1 | 8/2007 |
| WO | 01/94454 A1 | 12/2001 |

OTHER PUBLICATIONS

Hutter, et al.; "Colloid titration: A method to quantify the adsorption of cationic polymer by bleached hair"; Journal of the Society of Cosmetic Chemists; vol. 42; 1991; pp. 87-96.
Jebaramya, et al.; Spectral Studies of Toluidine Blue O in the Presence of Sodium Dodecyl Sulfate; Digest Journal of Nanomaterials and Biostructures; vol. 4; No. 4; Dec. 2009; pp. 789-797.
Lai and Friends, "Surface Wettability Enhancement of Silicone Hydrogel Lenses by Processing with Polar Plastic Molds", J. Biomed. Mat. Res. 35(3); 1997; pp. 349-356.
Roediger, et al.; Fluorescence Dye Adsorption Assay to Quantify Carboxyl Groups on the Surface of Poly(methyl methacrylate) Microbeads; Analytical Chemistry; vol. 83; 2011; pp. 3379-3385.

(Continued)

*Primary Examiner* — Michael F Pepitone
(74) *Attorney, Agent, or Firm* — Jian Zhou

(57) ABSTRACT

The invention is generally related to colored contact lenses which comprise a hydrogel lens body having an opaque color image therein and/or thereon and a durable lubricious coating thereon. The coating comprises an anchoring layer of a polyanionic polymer having carboxyl groups and a hydrogel layer which is derived from a hydrophilic polymeric material having azetidinium groups and is covalently attached onto the anchoring layer of the polyanionic polymer through linkages each formed between one carboxyl group and one azetidinium groups. The colored contact lens has a surface lubricity better than the lubricity of the non-silicone hydrogel lens body and a friction rating of about 2 or lower after 7 cycles of manual rubbing.

16 Claims, 1 Drawing Sheet

(56) References Cited

U.S. PATENT DOCUMENTS

| | | |
|---|---|---|
| 2013/0337160 A1 | 12/2013 | Holland et al. |
| 2015/0137397 A1 | 5/2015 | Katou |
| 2015/0166205 A1* | 6/2015 | Qiu .................. B65B 31/00 53/431 |
| 2016/0061995 A1 | 3/2016 | Chang et al. |
| 2016/0326046 A1 | 11/2016 | Quinter et al. |
| 2017/0068018 A1 | 3/2017 | Qian et al. |
| 2017/0068019 A1 | 3/2017 | Qian et al. |
| 2017/0165932 A1 | 6/2017 | Qian et al. |
| 2018/0079158 A1 | 3/2018 | Qiu et al. |
| 2018/0079889 A1 | 3/2018 | Chiang et al. |
| 2018/0081197 A1 | 3/2018 | Qiu et al. |
| 2018/0113236 A1 | 4/2018 | Bothe et al. |
| 2018/0120590 A1 | 5/2018 | Bothe |

OTHER PUBLICATIONS

Bhamla, et al.; "Influence of Lipid Coatings on Surface Wettability Characteristics of Silicone Hydrogels"; Langmuir; vol. 31; 2015; pp. 3820-3828.

Bhamla, et al.; "Instability and Breakup of Model Tear Films"; Investigative Ophthalmology & Visual Science; vol. 57; No. 3; Mar. 2016; pp. 949-958.

Tiraferri and Elimelech; "Direct Quantification of Negatively Charged Functional Groups on Membrane Surfaces"; Journal of Membrane Science; vol. 389; 2012; pp. 499-508.

Lorenz, et al.; "Atomic Force Microscopy and Scanning Electron Microscope Analysis of Daily Disposable Limbal Ring Contact Lenses"; Clinical and Experimental Optometry; vol. 97; 2014; pp. 411-417.

* cited by examiner

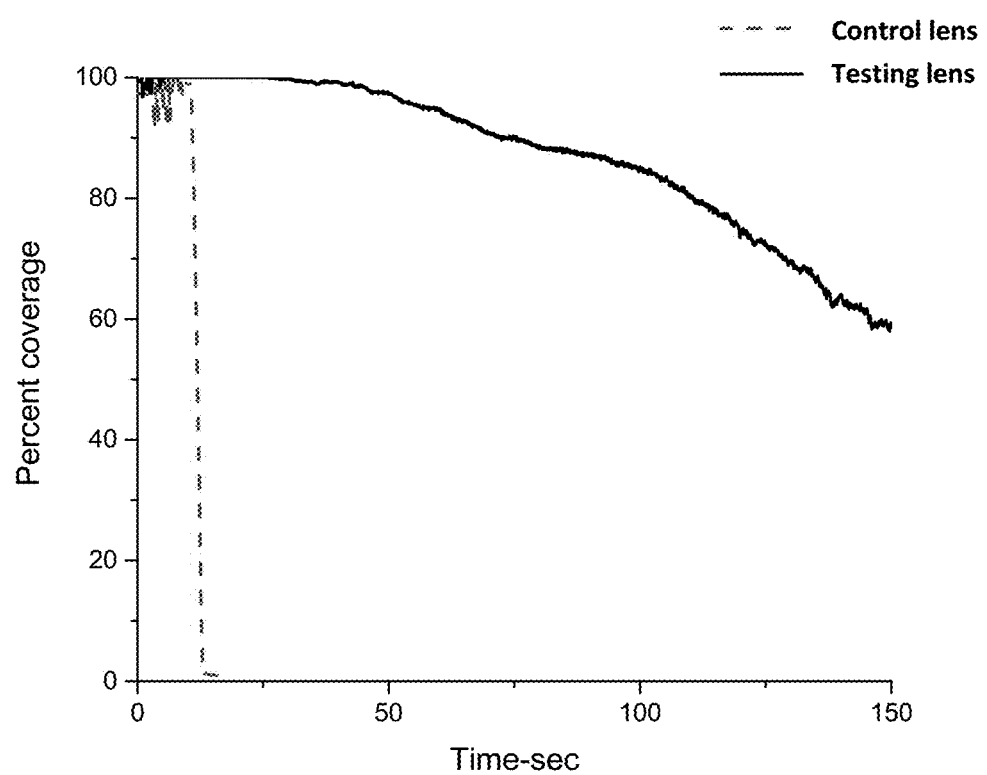

COLORED HYDROGEL CONTACT LENSES WITH LUBRICIOUS COATING THEREON

This application claims the benefit under 35 USC § 119(e) of U.S. provisional application No. 62/396,844 filed 20 Sep. 2016, herein incorporated by reference in its entirety.

This invention is related to colored hydrogel contact lenses which have a soft, lubricious hydrogel coating thereon. In addition, the invention provides a method for making such colored hydrogel contact lenses.

BACKGROUND

Colored contact lenses have been used to modify or enhance the color of a wearer's eyes. In general, there are two classes of colored contact lenses. The first class of colored contact lenses are those which use essentially transparent enhancement colors that combine with the color of the natural iris to produce a new appearance. Such tinted lenses typically are used to turn a hazel eye to an aqua colored eye. This class of colored lenses may not be able to change an underlying dark colored, brown iris to blue. The second category is the class of opaque colored lenses having a continuous opaque pattern that fully covers the iris or having an intermittent opaque pattern that partially covers the iris. Opaque colored contact lenses can effectively and substantially modify the wearer's eye color.

Opaque colored contact lenses, which can provide a natural appearance, can be produced by directly printing a colored image with an ink including pigment particles to the surface of a preformed contact lens. However, opaque colored contact lenses made according to this technique can have pigment particles protruding outwardly from the lens surface and may impart wearing discomfort when being worn by a user.

To reduce such wearing discomfort, opaque colored contact lenses are can be advantageously produced by first printing a colored image with a pigment-containing ink on a molding surface of a mold for cast-molding of a contact lens, dispensing a lens-forming composition in the mold with the colored image printed on one of the molding surface, and curing the lens-forming composition to obtain a cast-molded contact lens with the printed colored image which is transferred from the molding surface to the cast-molded contact lens during the curing process. Although opaque colored contact lenses made according to this technique can have pigment particles embedded in the lens surface (i.e., not protruding outwardly from the lens surface) but still being exposed, the printed area (i.e., particle-exposing areas) on the surface of the opaque colored contact lenses would have a roughness much higher than that of the non-printed areas. The higher roughness in the printed area on a lens surface may still impart wearing discomfort.

In order to reduce the roughness, it has been proposed to apply a clear coat (i.e., a layer of a polymerizable composition which can be either a lens-forming composition or any polymerizable composition free of any colorant onto a molding surface of a mold), and print a colored image with a pigment-containing ink onto the clear coat on the molding surface. However, the print quality can be severely degraded by the clear coat, due to loss in print intensity and increased smearing.

Therefore, there are still needs for a process for producing opaque colored contact lenses which can provide enhanced wearing comfort to users and for such opaque colored contact lenses.

SUMMARY

In one aspect, the invention provides a method for producing soft contact lenses, comprising the steps of: (1) obtaining a preformed hydrogel contact lens having a color image printed with an ink in and/or on one of the anterior and posterior surface of the hydrogel contact lens, wherein the ink comprises pigment particles and optionally one or more dyes; (2) contacting the preformed hydrogel contact lens with a first aqueous coating solution of a polyanionic polymer at a pH of about 4.0 or less and at a coating temperature of from about 25° C. to about 80° C. to obtain a colored contact lens precursor which is the preformed hydrogel contact lens having the color image and a layer of the polyanionic polymer thereon, wherein the polyanionic polymer is one or more homo- or copolymers of acrylic acid, methacrylic acid, or ethylacrylic acid, wherein the layer of the polyanionic polymer encloses the preformed hydrogel contact lens having the color image; and (3) heating the colored contact lens precursor obtained in step (2), in a second aqueous coating solution which comprises a water-soluble and thermally-crosslinkable hydrophilic polymeric material having azetidinium groups, at a temperature of from about 60° C. to about 140° C. for at least 30 minutes to crosslink the water-soluble thermally-crosslinkable hydrophilic polymeric material and the polyanionic polymer so as to form the colored contact lens with a hydrogel coating which is covalently attached onto the layer of the polyanionic polymer, wherein the colored contact lens in fully hydrated state has a friction rating of about 2 or lower after 7 cycles of manual rubbing.

In another aspect, the invention provides a colored hydrogel contact lens which comprises: a hydrogel lens body having an opaque color image thereon and/or therein; and a coating which encloses the hydrogel lens body and the opaque color image, wherein the coating comprises an anchoring layer of a polyanionic polymer and a layer of a hydrogel material, wherein the polyanionic polymer is one or more homo- or copolymers of acrylic acid, methacrylic acid, ethylacrylic acid, or 2-(meth)acrylamidoglycolic acid, wherein the hydrogel material is derived from a water-soluble thermally-crosslinkable hydrophilic polymeric material having azetidinium groups and is covalently attached onto the anchoring layer of the polyanionic polymer through linkages each formed between one carboxyl group and one azetidinium group, wherein the colored contact lens in fully hydrated state has a friction rating of about 2 or lower (preferably about 1.5 or lower, more preferably about 1.0 or lower, even more preferably about 0.5 or lower) after 7 cycles of manual rubbing.

BRIEF DESCRIPTION OF DRAWINGS

FIG. 1 shows the total liquid coverage as function of time for a control lens and a colored contact lens of the invention according to a preferred embodiment.

DETAILED DESCRIPTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

"About" as used herein means that a number referred to as "about" comprises the recited number plus or minus 1-10% of that recited number.

"Optional" or "optionally" means that the subsequently described event or circumstance can or cannot occur, and that the description includes instances where the event or circumstance occurs and instances where it does not.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "non-silicone hydrogel contact lens" refers to a contact lens comprising a non-silicone hydrogel bulk (core) material. A "silicone hydrogel contact lens" refers to a contact lens comprising a silicone hydrogel bulk (core) material.

A "soft contact lens" refers to a contact lens which has an elastic modulus (i.e., Young's modulus) of less than 2.0 MPa (preferably less than 1.5 MPa, more preferably less than 1.0 MPa).

A "hydrogel" or "hydrogel material" refers to a cross-linked polymeric material which has three-dimensional polymer networks (i.e., polymer matrix), is insoluble in water, but can hold at least 10 percent by weight of water in its polymer matrix when it is fully hydrated.

As used in this application, the term "non-silicone hydrogel" refers to a hydrogel that is theoretically free of silicon.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

The "front or anterior surface" of a contact lens, as used herein, refers to the surface of the lens that faces away from the eye during wear. The anterior surface, which is typically substantially convex, may also be referred to as the front curve of the lens.

The "rear or posterior surface" of a contact lens, as used herein, refers to the surface of the lens that faces towards the eye during wear. The rear surface, which is typically substantially concave, may also be referred to as the base curve of the lens.

A "colored contact lens" refers to a contact lens (hard or soft) having a color image printed thereon and/or therein. A color image can be a cosmetic pattern, for example, iris-like patterns, Wild Eye™ patterns, made-to-order (MTO) patterns, and the like. A color image can be a single color image or a multi-color image.

The term "non-opaque" as used herein is intended to describe transparent or translucent color or a part of the lens that is uncolored or colored with transparent or translucent coloring.

A "pigment" means a powdered substance that is suspended in a liquid in which it is insoluble. Pigments are used to impart color. Pigments, in general, are more opaque than dyes.

"Surface hydrophilicity", as used herein, describes a surface property that represents the extent to which a surface interacts with water, as measured by water-break-up-time (WBUT). The higher the value of WBUT is, the higher the surface hydrophilicity is.

In accordance with the invention, the "surface lubricity" of a contact lens (or a medical device) is measured by a friction rating which is a number from 0 to 4. The higher the value of friction rating is, the lower the surface lubricity is.

"Hydrophilic," as used herein, describes a material or portion thereof that will more readily associate with water than with lipids.

A "lens-forming material" or "lens-forming composition" interchangeably refers to a polymerizable composition which can be cured (i.e., polymerized and/or crosslinked) thermally or actinically (i.e., by actinic radiation) to obtain a crosslinked polymer.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

A "vinylic monomer" refers to a compound that has one sole ethylenically-unsaturated group.

The term "soluble", in reference to a compound or material in a solvent, means that the compound or material can be dissolved in the solvent to give a solution with a concentration of at least about 0.05% by weight at room temperature (i.e., from about 20° C. to about 30° C.).

The term "insoluble", in reference to a compound or material in a solvent, means that the compound or material can be dissolved in the solvent to give a solution with a concentration of less than 0.005% by weight at room temperature (as defined above).

The term "ethylenically unsaturated group" is employed herein in a broad sense and is intended to encompass any groups containing at least one >C=C< group. Exemplary ethylenically unsaturated groups include without limitation (meth)acryloyl

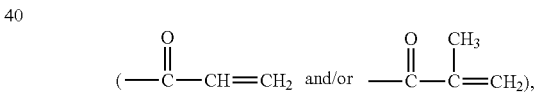

allyl,

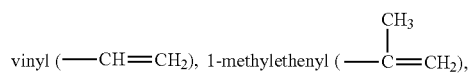

styrenyl, or the likes.

The term "(meth)acrylamide" refers to methacrylamide and/or acrylamide.

The term "(meth)acrylate" refers to methacrylate and/or acrylate.

A "hydrophilic vinylic monomer", as used herein, refers to a vinylic monomer which can be polymerized to form a homopolymer that is water-soluble or can absorb at least 10 percent by weight of water.

A "hydrophobic vinylic monomer" refers to a vinylic monomer which can be polymerized to form a homopolymer that is insoluble in water and can absorb less than 10 percent by weight of water.

As used in this application, the term "molecular weight" of a polymeric material (including monomeric or macromeric materials) refers to the weight-average molecular weight (Mw) unless otherwise specifically noted or unless testing conditions indicate otherwise.

A "macromer" or "prepolymer" refers to a compound or polymer that contains ethylenically unsaturated groups and has Mw of greater than 700 Daltons.

As used in this application, the term "vinylic crosslinker" refers to a compound having at least two ethylenically unsaturated groups. A "vinylic crosslinking agent" refers to a vinylic crosslinker having Mw of about 700 Daltons or less.

As used in this application, the term "polymer" means a material formed by polymerizing/crosslinking one or more monomers or macromers or prepolymers or combinations thereof.

The term "alkyl" refers to a monovalent radical obtained by removing a hydrogen atom from a linear or branched alkane compound. An alkyl group (radical) forms one bond with one other group in an organic compound.

The term "alkylene divalent group" or "alkylene diradical" or "alkyl diradical" interchangeably refers to a divalent radical obtained by removing one hydrogen atom from an alkyl. An alkylene divalent group forms two bonds with other groups in an organic compound.

The term "alkyl triradical" refers to a trivalent radical obtained by removing two hydrogen atoms from an alkyl. A alkyl triradical forms three bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

In this application, the term "substituted" in reference to an alkyl diradical or an alkyl radical means that the alkyl diradical or the alkyl radical comprises at least one substituent which replaces one hydrogen atom of the alkyl diradical or the alkyl radical and is selected from the group consisting of hydroxy (—OH), carboxy (—COOH), —NH$_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, halogen atom (Br or Cl), and combinations thereof.

In this application, an "oxazoline" refers to a compound of

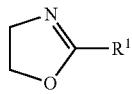

in which: $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR" in which alk is $C_1$-$C_4$ alkyl diradical; R" is $C_1$-$C_4$ alkyl (preferably methyl); and m3 is an integer from 1 to 10 (preferably 1 to 5).

In this application, the term "polyoxazoline" refers to a linear polymer having a formula of

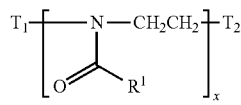

in which: $T_1$ and $T_2$ are two terminal groups; $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR in which alk is $C_1$-$C_4$ alkyl diradical; R" is $C_1$-$C_4$ alkyl (preferably methyl); m3 is an integer from 1 to 10 (preferably 1 to 5); x is an integer from 5 to 500. A polyoxazoline segment has a divalent polymer chain of a formula of

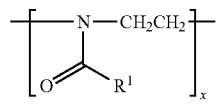

in which $R^1$ and x are as defined above.

In this application, the term "poly(2-oxazoline-co-ethyleneimine)" refers to a statistical copolymer having a formula of

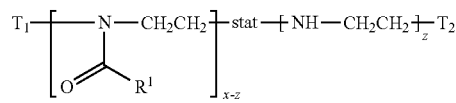

in which: $T_1$ and $T_2$ are terminal groups; $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR" in which alk is $C_1$-$C_4$ alkyl diradical; R" is $C_1$-$C_4$ alkyl (preferably methyl); m3 is an integer from 1 to 10 (preferably 1 to 5); x is an integer from 5 to 500; z is an integer equal to or less than x. A poly(2-oxazoline-co-ethyleneimine) is obtained by hydrolyzing a polyoxazoline.

In this application, the term "poly(2-oxazoline-co-ethyleneimine)-epichlorohydrin" refers to a polymer obtained by reacting a poly(2-oxazoline-co-ethyleneimine) with epichlorohydrin to convert all or substantial percentage (≥90%) of the secondary amine groups of the poly(2-oxazoline-co-ethyleneimine) into azetidinium groups. Examples of poly (2-oxazoline-co-ethyleneimine)-epichlorohydrin are disclosed in U.S. pat. Appl. pub. No. 2016/0061995 A1 (herein incorporated by reference in its entirety).

An "epichlorohydrin-functionalized polyamine" or "epichlorohydrin-functionalized polyamidoamine" refers to a polymer obtained by reacting a polyamine or polyamidoamine with epichlorohydrin to convert all or a substantial percentage of the secondary amine groups of the polyamine or polyamidoamine into azetidinium groups.

The term "polyamidoamine-epichlorohydrin" refers to an epichlorohydrin-functionalized adipic acid-diethylenetriamine copolymer.

In this application the term "azetidinium" or "3-hydroxyazetidinium" refers to a positively-charged, divalent radical (or group or moiety) of

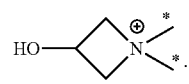

The term "thermally-crosslinkable" in reference to a polymeric material or a functional group means that the polymeric material or the functional group can undergo a crosslinking (or coupling) reaction with another material or functional group at a relatively-elevated temperature (from about 40° C. to about 140° C.), whereas the polymeric material or functional group cannot undergo the same crosslinking reaction (or coupling reaction) with another material or functional group at room temperature (i.e., from about 22° C. to about 28° C., preferably from about 24° C. to about 26° C., in particular at about 25° C.) to an extend detectable for a period of about one hour.

As used in this application, the term "phosphorylcholine" refers to a monovalent zwitterionic group of

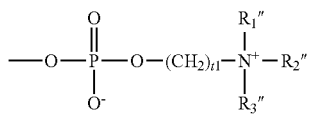

in which t1 is an integer of 1 to 5 and $R_1''$, $R_2''$ and $R_3''$ independently of one another are $C_1$-$C_8$ alkyl or $C_1$-$C_8$ hydroxyalkyl.

As used in this application, the term "reactive vinylic monomer" refers to any vinylic monomer having at least one reactive functional group selected from the group consisting of carboxyl group, primary amino group, and secondary amino group.

As used in this application, the term "non-reactive vinylic monomer" refers to any vinylic monomer (either hydrophilic or hydrophobic vinylic monomer) free of carboxyl group, primary amino group, secondary amino group, epoxide group, isocyanate group, azlactone group, or aziridine group.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

A "spatial limitation of actinic radiation" refers to an act or process in which energy radiation in the form of rays is directed by, for example, a mask or screen or combinations thereof, to impinge, in a spatially restricted manner, onto an area having a well-defined peripheral boundary. A spatial limitation of UV radiation is obtained by using a mask or screen having a radiation (e.g., UV and/or visible light) permeable region, a radiation (e.g., UV and/or visible light) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6), all of which are incorporated by reference in their entireties. The mask or screen allows to spatially projects a beam of radiation (e.g., UV radiation and/or visible radiation) having a cross-sectional profile defined by the projection contour of the mask or screen. The projected beam of radiation (e.g., UV radiation and/or visible radiation) limits radiation impinging on a lens formulation located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV and/or visible beam (i.e., a spatial limitation of radiation). The radiation used for the crosslinking is radiation energy, especially UV radiation (and/or visible radiation), gamma radiation, electron radiation or thermal radiation, the radiation energy preferably being in the form of a substantially parallel beam in order on the one hand to achieve good restriction and on the other hand efficient use of the energy.

The term "modulus" or "elastic modulus" in reference to a contact lens or a material means the tensile modulus or Young's modulus which is a measure of the stiffness of a contact lens or a material. The modulus can be measured using a method in accordance with ANSI Z80.20 standard. A person skilled in the art knows well how to determine the elastic modulus of a silicone hydrogel material or a contact lens. For example, all commercial contact lenses have reported values of elastic modulus.

A "water contact angle" refers to an average water contact angle (i.e., contact angles measured by Sessile Drop method) at the room temperature, which is obtained by averaging measurements of contact angles with at least 3 individual contact lenses.

The term "durability" in reference to a coating on a hydrogel contact lens is intended to describe that the coating on the hydrogel contact lens can survive a desired number of cycles of manual rubbing.

As used herein, "surviving a number ("j") of cycles of manual rubbing" in reference to a coating on a contact lens means that after j cycles of manual rubbing according to the procedure described in Example 1, the contact lens has a manual-rubbing-induced increase in friction rating after j cycles of manual rubbing, $\Delta FR_{DR}(j)$, of about 60% or less (preferably about 50% or less, more preferably about 40% or less, even more preferably about 30% or less), wherein $$\Delta FR_{DR}(j) = \frac{FR_{jDR} - FR_{0DR}}{4} \times 100\%$$

in which $FR_{0DR}$ is the friction rating of the contact lens which is in fully-hydrated state and is subjected to zero manual rubbing, and $FR_{jDR}$ is the friction rating of the contact lens which is in fully hydrated state and has been subjected to j cycles of manual rubbing, wherein j is an integer of 2 (preferably 7, more preferably 14, even more preferably 30).

The term "one cycle of manual rubbing" means that contact lenses (or medical devices) with a coating thereon are manually rubbed (wearing disposable powder-free latex gloves) with RENU® multi-purpose lens care solution (or another multi-purpose lens care solution) for 20 seconds and then rinsed with saline. The above procedure can be repeated for a given times, e.g., from 2 to 30 times and number of repetitions of manual rubbing is the number of cycles of manual rubbing.

An "aqueous solution" or a "water-based solution" interchangeably refers to a solution which is a homogeneous mixture consisting of a water-based solvent and one or more solutes dissolved in the water-based solvent. A "water-based solvent" is intended to describe a solvent system which consists of at least 70%, preferably at least 80%, more preferably at least 90%, even more preferably at least 95%) by weight of water and at most 30% (preferably about 20% or less, more preferably about 10% or less, even more preferably about 5% or less, in particular about 2% or less) by weight of one or more organic solvents relative to the weight of the solvent system. An aqueous coating solution refers to an aqueous solution containing at least one polymeric coating material as a solute in the solution.

An "organic-based solution" refers to a solution which is a homogeneous mixture consisting of an organic-based solvent and one or more solutes dissolved in the organic based solvent. An "organic-based solvent" is intended to describe a solvent system which consists of one or more organic solvents and less than 40%, preferably about 30% or less, more preferably about 20% or less, even more preferably about 10% or less, in particular about 5% or less by weight of water relative to the weight of the solvent system. An organic-based coating solution refers to an organic-based solution containing at least one polymeric coating material as a solute in the solution.

A "print-on-mold process for producing colored contact lenses" refers to a process for molding a colored contact lens described in U.S. Pat. No. 5,034,166 to Rawlings et al. (herein incorporated by reference).

The invention is generally related to a method for producing colored contact lenses designed for enhancing a wearer's eye color while providing a very natural appearance as perceived by the ordinary viewer. A colored contact lens of the invention comprises a hydrogel lens body, a colored image printed in or on the surface of the hydrogel lens body, and a coating on the surface of the hydrogel lens body. The coating has a thickness of at least 0.1 μm and comprises an anchoring layer of a polyanionic polymer having carboxyl groups and a soft, lubricious hydrogel layer covalently attached onto the anchoring layer. With a relatively-thick layer of a soft lubricious hydrogel layer on the surface, the colored contact lens can provide wearing comfort superior to currently-available commercial colored contact lenses.

It is discovered that such colored contact lenses can be produced by applying a soft lubricous hydrogel coating according to the simple solution coating process. To form such a coating, a water-based coating process can be used to apply an anchoring layer of a polyanionic polymer (e.g., polyacrylic acid or polymethacrylic acid or the like) onto a preformed colored contact lens which has a color image printed in or on at least one of the lens surfaces (anterior or posterior surfaces). It is believed that hydrogen-bonds formed between a functional group (e.g., amide group, hydroxyl group, polyethylene glycol segment, or the likes) of the lens hydrogel material and carboxyl groups (in protonated form) of the polyanionic polymer at low pH (i.e., lower than about 4.0) may be sufficient to allow the hydrogel contact lens bind stably a layer of the polyanionic polymer. Such a layer of the polanionic polymer can fully cover the surfaces of the hydrogel contact lens, even pigment particles protruding out of the lens surface or printed areas in the lens surface, even though the pigment particles may not comprise functional groups capable of forming hydrogen bonds with the polyanionic polymer. Such a layer of polyanionic polymer can function as an anchoring layer for covalently attaching a hydrogel layer to form a relatively-durable lubricious coating having a desired thickness. It is further discovered that resultant colored contact lenses have a good surface lubricity, an elastic modulus lower than that of the lens body, thereby imparting a significantly improved wearing comfort.

In one aspect, the invention provides a method for producing soft contact lenses, comprising the steps of: (1) obtaining a preformed hydrogel contact lens having a color image printed with an ink in and/or on one of the anterior and posterior surface of the hydrogel contact lens, wherein the ink comprises pigment particles; (2) contacting the preformed hydrogel contact lens with a first aqueous coating solution of a polyanionic polymer at a pH of about 4.0 or less (preferably about 3.5 or less, more preferably about 3.0 or less, even more preferably from about 0.5 to about 2.5) and at a coating temperature of from about 25° C. to about 80° C. (preferably from about 30° C. to about 75° C., more preferably from about 35° C. to about 70° C., even more preferably from about 40° C. to about 60° C.) to obtain a colored contact lens precursor which is the preformed hydrogel contact lens having the color image and a layer of the polyanionic polymer thereon, wherein the polyanionic polymer is one or more homo- or copolymers of acrylic acid, methacrylic acid, ethylacrylic acid, or 2-(meth)acrylamidoglycolic acid, wherein the layer of the polyanionic polymer encloses the preformed hydrogel contact lens having the color image; and (3) heating the colored contact lens precursor obtained in step (2), in a second aqueous coating solution which comprises a water-soluble and thermally-crosslinkable hydrophilic polymeric material having azetidinium groups, at a temperature of from about 60° C. to about 140° C. for at least 30 minutes to crosslink the water-soluble thermally-crosslinkable hydrophilic polymeric material and the polyanionic polymer so as to form the colored contact lens with a hydrogel coating which is covalently attached onto the layer of the polyanionic polymer, wherein the colored contact lens in fully hydrated state has a friction rating of about 2 or lower (preferably about 1.5 or lower, more preferably about 1.0 or lower, even more preferably about 0.5 or lower) after 7 cycles of manual rubbing. Preferably, the elastic modulus of the colored contact lens is equal to the elastic modulus of the preformed hydrogel contact lens within a margin of about ±10% or less (preferably about +8%, even more preferably about ±6%).

In accordance with the invention, a preformed hydrogel contact lens is any hydrogel contact lens, which is produced according to any lens manufacturing processes and has not been subjected to any surface treatment after lens-forming process. For example, preformed contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810, or by lathe cutting of buttons as used in making customized contact lenses. In cast-molding, a lens formulation typically is dispensed into molds and cured (i.e., polymerized and/or crosslinked) in molds for making contact lenses.

For production of preformed non-silicone hydrogel contact lenses, a hydrogel lens formulation typically is: either (1) a monomer mixture comprising (a) at least one hydrophilic vinylic monomer (e.g., hydroxyethyl methacrylate, glycerol methacrylate, N-vinylpyrrolidone, or combinations thereof) and (b) at least one component selected from the group consisting of a crosslinking agent, a hydrophobic vinylic monomer, a lubricating agent (or so-called internal wetting agents incorporated in a lens formulation), a free-radical initiator (photoinitiator or thermal initiator), a UV-absorbing agent, a visibility tinting agent (e.g., dyes, pigments, or mixtures thereof), antimicrobial agents (e.g., preferably silver nanoparticles), a bioactive agent, and combinations thereof; or (2) an aqueous solution comprising one or more water-soluble prepolymers and at least one component selected from the group consisting of hydrophilic vinylic monomer, a crosslinking agent, a hydrophobic vinylic monomer, a lubricating agent (or so-called internal wetting agents incorporated in a lens formulation), a free-radical initiator (photoinitiator or thermal initiator), a UV-absorbing agent, a visibility tinting agent (e.g., dyes, pigments, or mixtures thereof), antimicrobial agents (e.g., preferably silver nanoparticles), a bioactive agent, and combinations thereof. Resultant preformed hydrogel contact lenses then can be subjected to extraction with an extraction solvent to remove unpolymerized components from the resultant lenses and to hydration process, as known by a person skilled in the art. It is understood that a lubricating agent present in a hydrogel lens formulation can improve the lubricity of preformed hydrogel contact lenses compared to the lubricity of control preformed hydrogel contact lenses obtained from a control hydrogel lens formulation without the lubricating agent.

Currently, most commercially-available non-silicone hydrogel contact lenses are made of a copolymer of hydroxyethyl (meth)acrylate with one or more vinylic monomers and one or more vinylic crosslinking agents, a copolymer of glycerol (meth)acrylate with one or more vinylic monomers and one or more vinylic crosslinking agents, a crosslinked polyvinylalcohol.

For production of preformed silicone hydrogel (SiHy) contact lenses, a SiHy lens formulation for cast-molding or spin-cast molding or for making SiHy rods used in lathe-cutting of contact lenses generally comprises at least one components selected from the group consisting of a silicone-containing vinylic monomer, a silicone-containing vinylic macromer, a silicone-containing prepolymer, a hydrophilic vinylic monomer, a hydrophobic vinylic monomer, a cross-linking agent (a compound having a molecular weight of about 700 Daltons or less and containing at least two ethylenically unsaturated groups), a free-radical initiator (photoinitiator or thermal initiator), a hydrophilic vinylic macromer/prepolymer, and combination thereof, as well known to a person skilled in the art. A SiHy contact lens formulation can also comprise other necessary components known to a person skilled in the art, such as, for example, a UV-absorbing agent, a visibility tinting agent (e.g., dyes, pigments, or mixtures thereof), antimicrobial agents (e.g., preferably silver nanoparticles), a bioactive agent, lubricating agents (or so-called internal wetting agents incorporated in a lens formulation), leachable tear-stabilizing agents, and mixtures thereof, as known to a person skilled in the art. Resultant preformed SiHy contact lenses then can be subjected to extraction with an extraction solvent to remove unpolymerized components from the resultant lenses and to hydration process, as known by a person skilled in the art.

Numerous SiHy lens formulations have been described in numerous patents and patent applications published by the filing date of this application. All of them can be used in obtaining a preformed SiHy lens. A SiHy lens formulation for making commercial SiHy lenses, such as, lotrafilcon A, lotrafilcon B, balafilcon A, galyfilcon A, senofilcon A, narafilcon A, narafilcon B, comfilcon A, enfilcon A, asmofilcon A, somofilcon A, stenfilcon A, smafilcon A, enfilcon A, and efrofilcon A can also be used in making preformed SiHy contact lenses.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711, 4,460,534, 5,843,346, and 5,894,002, which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire. Polar plastic molds can preferably be used to produce silicone hydrogel contact lenses having a much better wettability than non-polar plastic molds (e.g., polypropylene molds) (see, Lai and Friends, "Surface Wettability Enhancement of Silicone Hydrogel Lenses by Processing with Polar Plastic Molds", *J. Biomed. Mat. Res.* 35(3): 349-356 (1997); U.S. Pat. No. 5,352,714, herein incorporated by references in their entireties).

Reusable molds can also be used and the lens formulation is cured actinically under a spatial limitation of actinic radiation to form a contact lens. Examples of preferred reusable molds are those disclosed in U.S. Pat. Nos. 6,800,225, 7,384,590, and 7,387,759, which are incorporated by reference in their entireties. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, etc.

In accordance with the invention, a lens formulation can be introduced (dispensed) into a cavity formed by a mold according to any known methods.

After the lens formulation is dispensed into the mold, it is polymerized to produce a contact lens. Polymerization may be initiated thermally or actinically, preferably by exposing the lens formulation in the mold to a spatial limitation of actinic radiation to crosslink the polymerizable components in the lens formulation.

Opening of the mold so that the molded article can be removed from the mold may take place in a manner known per se.

The molded contact lens can be subject to lens extraction to remove unpolymerized polymerizable components. The extraction solvent can be any solvent known to a person skilled in the art. Examples of suitable extraction solvent are those described above.

In a preferred embodiment, the preformed hydrogel contact lens is a non-silicone hydrogel contact lens composed of a polymer comprising at least 50% by mole of repeating units of one or more hydroxyl-containing vinylic monomers. A person skilled in the art knows hydroxyl-containing vinylic monomers suitable for making hydrogel contact lenses. Examples of preferred hydroxyl-containing vinylic monomers includes without limitation hydroxyethyl (meth)acrylate, 2-hydroxypropyl (meth)acrylate, 3-hydroxypropyl (meth)acrylate, glycerol (meth)acrylate, N-2-hydroxyethyl (meth)acrylamide, N-2-hydroxypropyl (meth)acrylamide, N-3-hydroxypropyl (meth)acrylamide, N,N-bis(hydroxyethyl) (meth)acrylamide, N-2,3-dihydroxypropyl (meth) acrylamide, N-tris(hydroxymethyl)methyl (meth)acrylamide, vinyl alcohol, allyl alcohol, and combinations thereof. Optionally but preferably, the preformed non-silicone hydrogel contact lens which is composed of polymer comprising at least 50% by mole of repeating units of at least one hydroxyl-containing vinylic monomer and repeating units of at least one amide-containing vinylic monomer. It is believed that the amide group in such an amide-containing vinylic monomer can form hydrogen bonds with carboxyl groups. Examples of preferred amide-containing vinylic monomers include without limitation (meth)acrylamide, N,N-dimethyl (meth)acrylamide, N-vinylpyrrolidone (NVP), N-vinyl formamide, N-vinyl acetamide, N-vinyl isopropylamide, N-vinyl-N-methyl acetamide, N,N-dimethylaminopropyl (meth)acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, and combinations thereof.

In another preferred embodiment, the preformed non-silicone hydrogel contact lens is a polyvinylalcohol-based hydrogel contact lens. More preferably, a preformed polyvinylalcohol-based hydrogel contact lens is obtained by polymerizing an aqueous lens-forming composition comprising a water-soluble, actinically-crosslinkable polyvinyl alcohol prepolymer which comprises:

repeating units of vinyl alcohol

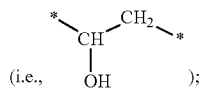

(i.e., $\overset{*}{CH}\overset{CH_2}{\underset{OH}{|}}*$ );

repeating crosslinking units of formula (I); and

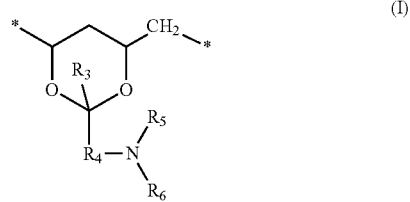

in which:
R$_3$ can be hydrogen or a C$_1$-C$_6$ alkyl group (preferably hydrogen);
R$_4$ is a C$_1$-C$_6$ alkylene divalent radical (preferably a C$_1$-C$_4$ alkylene divalent radical, more preferably methylene or butylene divalent radical, even more preferably methylene divalent radical);
R$_5$ is hydrogen or C$_1$-C$_6$ alkyl (preferably hydrogen or C$_1$-C$_4$ alkyl, more preferably hydrogen or methyl or ethyl, even more preferably hydrogen or methyl);
R$_6$ is an ethylenically unsaturated group of

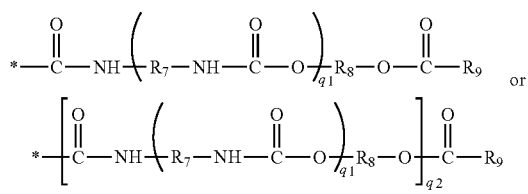

in which q1 and q2 independently of each another are zero or one, and R$_7$ and R$_8$ independently of one another are a C$_2$-C$_8$ alkylene divalent radical, R$_9$ is C$_2$-C$_8$ alkenyl.

Preferably, wherein R$_4$ is methylene divalent radical, R$_5$ is hydrogen or C$_1$-C$_4$ alkyl, R$_3$ is hydrogen, and R$_6$ is a radical of

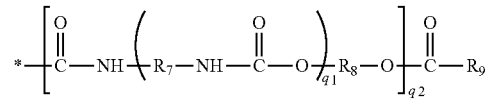

in which q2 is zero, R$_9$ is vinyl (*—CH=CH$_2$) or 1-methylethenyl (*—C(CH$_3$)=CH$_2$). More preferably, the polyvinylalcohol prepolymer has a weight average molecular weight of at least about 2,000 Daltons, and comprises from about 1% to about 25% by mole, preferably from about 2% to about 15% by mole of the repeating units of formula (I). A water-soluble, actinically-crosslinkable polyvinylalcohol prepolymer can be prepared using techniques known in the art, e.g., those disclosed in U.S. Pat. Nos. 5,583,163 and 6,303,687 (herein incorporated by references in their entireties).

In another preferred embodiment, the preformed hydrogel contact lens is a silicone hydrogel contact lens.

A person skilled in the art knows how to obtain a preformed hydrogel contact lens having a color image thereon and/or therein according to any known methods.

One of the well-known methods involves directly printing an ink on at least one of the anterior and posterior surfaces of a preformed hydrogel contact lens, according to pad transferring printing and/or inkjet printing technique.

Any inks can be used in the invention. Generally, an ink comprises pigment particles and at least one binder polymer and a solvent. It optionally includes a crosslinker, a humectant, a surfactant, a monomer, a polymerization initiator, an antimicrobial agent, an antioxidant agent, an anti-kogating agent, and other additives known in the art.

"A binder polymer" refers to a crosslinkable polymer that comprises crosslinkable groups and can be crosslinked by a crosslinker or upon initiation by a chemical or physical means (e.g., moisture, heating, UV irradiation or the like) to trap or bind colorants (i.e., pigment particles) onto or into a contact lens such as that term is known in the art.

The term crosslinkable groups is employed herein in a broad sense and is intended to encompass, for example, functional groups and photo crosslinkable or thermally crosslinkable groups, which are well-known to a person skilled in the art. It is well known in the art that a pair of matching crosslinkable groups can form a covalent bond or linkage under known reaction conditions, such as, oxidation-reduction conditions, dehydration condensation conditions, addition conditions, substitution (or displacement) conditions, free radical polymerization conditions, 2+2 cycloaddition conditions, Diels-Alder reaction conditions, ROMP (Ring Opening Metathesis Polymerization) conditions, vulcanization conditions, cationic crosslinking conditions, and epoxy hardening conditions. For example, an amino group is covalently bondable with aldehyde (Schiff base which is formed from aldehyde group and amino group may further be reduced); an hydroxyl group and an amino group are covalently bondable with carboxyl group; carboxyl group and a sulfo group are covalently bondable with hydroxyl group; a mercapto group is covalently bondable with amino group; or a carbon-carbon double bond is covalently bondable with another carbon-carbon double bond.

Exemplary covalent bonds or linkage, which are formed between pairs of crosslinkable groups, include without limitation, alkane (carbon-carbon single bond), alkene (carbon-carbon double bond), ester, ether, acetal, ketal, vinyl ether, carbamate, urea, amine, amide, enamine, imine, oxime, amidine, iminoester, carbonate, orthoester, phosphonate, phosphinate, sulfonate, sulfinate, sulfide, sulfate, disulfide, sulfinamide, sulfonamide, thioester, aryl, silane, siloxane, heterocycles, thiocarbonate, thiocarbamate, and phosphonamide.

Exemplary crosslinkable groups include, without limitation, hydroxyl group, amine group, amide group, sulfhydryl group, —COOR (R and R' are hydrogen or $C_1$ to $C_8$ alkyl groups), halide (chloride, bromide, iodide), acyl chloride, isothiocyanate, isocyanate, monochlorotriazine, dichlorotriazine, mono- or di-halogen substituted pyridine, mono- or di-halogen substituted diazine, phosphoramidite, maleimide, aziridine, sulfonyl halide, hydroxysuccinimide ester, hydroxysulfosuccinimide ester, imido ester, hydrazine, axidonitrophenyl group, azide, 3-(2-pyridyl dithio)proprionamide, glyoxal, aldehyde, epoxy, olefinically unsaturated radicals.

A binder polymer in the ink can be any polymer which is compatible with lens material. A binder polymer can be prepared by polymerization of monomers containing vinyl alcohol, vinyl butyral, vinyl acetate, acrylic acid, methacrylic acid, hydroxy $C_1$ to $C_6$ alkyl ester of acrylic acid and methacrylic acid, amino $C_1$ to $C_8$ alkyl ester of acrylic and methacrylic acid, glycerol esters of acrylic and methacrylic acid, vinylpyrrolidone, vinylchloride, hydroxyethyl methacrylate, dimethylacrylamide, and the like. Mixtures of these different monomers could be made to form various copolymers. Other polymers could include various cellulosic resins, polyesters, polyurethanes, polyureas, or polyamides that have at least one crosslinkable group. Preferably, monomers used in preparing a binding polymer is the same as that for monomers used in making a lens.

An ink for printing a colored lens of the invention can be prepared according to any known suitable methods. For example, first a solution of binding polymer and solvent is prepared and this solution is mixed with paste containing the colorant to form an ink. It is currently preferred to form inks from binding polymer solutions having a viscosity of about 40,000 cps.

Pad transfer printing is well known in the art (see. For example, U.S. Pat. No. 3,536,386 to Spivack; U.S. Pat. Nos. 4,582,402 and 4,704,017 to Knapp; U.S. Pat. No. 5,034,166 to Rawlings et al., herein incorporated by reference in their entireties). A typical example of this printing follows. An image is etched into metal to form a cliché. The cliché is placed in a printer. Once in the printer, the cliché is inked by either an open inkwell doctoring system or by a closed ink cup sliding across the image. Then, a silicone pad picks up the inked image from the cliché and transfers the image to the contact lens. The silicone pads are made of a material comprising silicone that can vary in elasticity. The properties of the silicone material permit the inks to stick to the pad temporarily and fully release from the pad when it contacts a contact lens or a mold. Appropriate pad-transfer printing structures include, but are not limited to, Tampo-type printing structures (Tampo vario 90/130), rubber stamps, thimbles, doctor's blade, direct printing, or transfer printing as they are known in the art.

Any known suitable silicone pad can be used in the present invention. Silicone pads are commercially available. However, different pads could give different print qualities. A person skilled in the art will know how to select a pad for a given ink.

Clichés can be made of ceramics or metals (e.g., steel). Where a cliché is made of a steel, it would be desirable to neutralize the pH of a water-based ink (e.g., adjusted pH to 6.8~7.8) by adding a buffer (such as, for example, phosphate salts). Images can be etched into a cliché according to any methods known to a person skilled in the art, for example, by chemical etching or laser ablation or the like. It is also desirable to clean clichés after use using standard cleaning techniques known to a person skilled in the art, such as, for example, immersion in a solvent, sonication, or mechanical abrasion.

It is understood that either the anterior (convex) or posterior (concave) surfaces of the lens may be printed, but printing the anterior surface is presently preferred.

Printing the lens using an inkjet printing process is described in published US Patent Application Nos. 2001/0050753, 2001/0085934, 2003/0119943, and 2003/0184710, herein incorporated by references in their entireties.

Alternatively, a preformed hydrogel contact lens having a color image thereon and/or therein can be made according to a print-on-mold process similar to those described in U.S. Pat. No. 5,034,166 to Rawlings et al. (herein incorporated by reference). An ink can be applied first on the molding surface of one or both mold portions by using pad transfer printing (or pad printing) or inkjet printing to form a colored coat (with a color image). A colored coat can be applied on the molding surface defining the posterior (concave) surface of a contact lens or on the molding surface defining the anterior surface of a contact lens or on both mold portions. Preferably, a colored coat (with a color image) is applied on the molding surface defining the anterior surface of a contact lens.

After printing an ink of the invention on a molding surface of a mold, the printed ink can be cured thermally or actinically. It is desirable that the printed ink is cured actinically to an extent to minimize loss of pattern definition of the color image resulted from subsequent filling of a lens-forming material.

Numerous colored hydrogel contact lenses are commercially available on the market. Those commercially-available colored hydrogel contact lenses can be used in the invention.

In accordance with the invention, contacting of a preformed hydrogel contact lens with a first aqueous coating solution can occur by dipping it into the first aqueous coating solution or by spraying it with the first aqueous coating solution. One contacting process involves solely dipping the preformed hydrogel contact lens in a bath of a first aqueous coating solution for a period of time or alternatively dipping the preformed hydrogel contact lens sequentially in a series of bath of first aqueous coating solutions for a fixed shorter time period for each bath. Another contacting process involves solely spray a first aqueous coating solution. However, a number of alternatives involve various combinations of spraying- and dipping-steps may be designed by a person having ordinary skill in the art. Preferably, the step of contacting is performed by dipping the preformed hydrogel contact lens in the first aqueous coating solution.

The first aqueous coating solution has a pH of about 4 or less, preferably about 3.5 or less, more preferably about 3.0 or less, even more preferably from about 0.5 to about 2.5.

The first aqueous coating solution has a temperature (i.e., coating temperature) of from about 25° C. to about 80° C.

(preferably from about 30° C. to about 75° C., more preferably from about 35° C. to about 70° C., even more preferably from about 40° C. to about 60° C.).

The preformed hydrogel contact lens is in contact with the first aqueous coating solution for a contacting time of at least about one minute, preferably at least about 5 minutes, more preferably at least about 10 minutes, even more preferably about 30 minutes.

In accordance with the invention, the polyanionic polymer is one or more homo- or copolymers of acrylic acid, methacrylic acid, or ethylacrylic acid; preferably is poly(acrylic acid) (PAA), poly(methacrylic acid) (PMAA), poly(acrylic acid-co-methacrylic acid) (pAA-pMAA), poly(ethylacrylic acid) (PEAA), poly(acrylic acid-co-ethylacrylic acid) (pAA-pEAA), poly(methacrylic acid-co-ethylacrylic acid) (pMAA-pEAA), or a combination thereof; more preferably is poly(acrylic acid) (PAA), poly(methacrylic acid) (PMAA), poly(acrylic acid-co-methacrylic acid) (pAA-pMAA), or a combination thereof. The polyanionic polymer has a weight average molecular weight of at least 100,000 Daltons (preferably from 200,000 to 10,000,000 Daltons, more preferably from 300,000 to 5,000,000 Daltons, even more preferably from 400,000 to 3,000,000 Daltons).

In accordance with the invention, a water-soluble and thermally-crosslinkable hydrophilic polymeric material comprises azetidinium groups and is a partial reaction product of at least one azetidinium-containing polymer with at least one hydrophilicity-enhancing agent (i.e., a wetting agent) having at least one carboxyl, primary amine, secondary amine, or thiol group, according to the crosslinking reactions shown in Scheme I Scheme 1

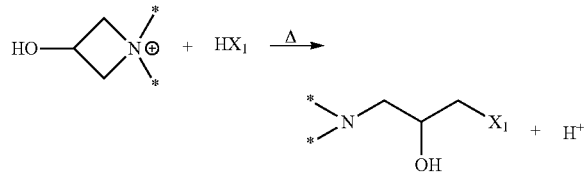

in which $X_1$ is —S—*, —OC(=O)—*, or —NR'—* in which R' is hydrogen or a $C_1$-$C_4$ unsubstituted or substituted alkyl group, and * represents an organic radical.

Any suitable azetidinium-containing polymers can be used in the invention. Examples of azetidinium-containing polymers includes without limitation epichlorohydrin-functionalized polyamines, homopolymers of an azetidinium-containing vinylic monomer, copolymers of an azetidinium-containing vinylic monomer with one or more vinylic monomers.

Preferably, an azetidinium-containing polymer is an epichlorohydrin-functionalized polyamine. An epichlorohydrin-functionalized polyamine can be obtained by reacting epichlorohydrin with a polyamine polymer or a polymer containing secondary amino groups. For example, a poly(alkylene imines) or a poly(amidoamine) which is a polycondensate derived from a polyamine and a dicarboxylic acid (e.g., adipic acid-diethylenetriamine copolymers) can react with epichlorohydrin to form an epichlorohydrin-functionalized polymer; a homopolymer or copolymer of mono-alkylaminoalkyl (meth)acrylate or mono-alkylaminoalkyl (meth)acrylamide can also react with epichlorohydrin to form an epichlorohydrin-functionalized polyamine; a poly(2-oxazoline-co-ethyleneimine) copolymer can react with epichlorohydrin to form an epichlorohydrin-functionalized polyamine (i.e., a poly(2-oxazoline-co-ethyleneimine)-epichlorohydrin). The reaction conditions for epichlorohydrin-functionalization of a polyamine or polyamidoamine polymer are taught in EP1465931 (herein incorporated by reference in its entirety). A preferred epichlorohydrin-functionalized polyamine is polyamidoamine-epichlorohydrin (PAE) or a poly(2-oxazoline-co-ethyleneimine)-epichlorohydrin.

Polyamidoamine-epichlorohydrin is commercially available, such as, for example, Kymene® or Polycup® resins (epichlorohydrin-functionalized adipic acid-diethylenetriamine copolymers) from Hercules.

Poly(2-oxazoline-co-ethyleneimine)-epichlorohydrin can be prepared according to procedures described in U.S. Pat. Appl. Pub. No. US 2016/0061995 A1 (herein incorporated by reference in its entirety).

Homopolymers and copolymers of an azetidinium-containing vinylic monomer can be obtained according to the procedures described in U.S. Pat. Appl. Pub. No. 2013/0337160A1 (herein incorporated by reference in its entirety).

Any suitable hydrophilicity-enhancing agents can be used in the invention so long as they are ophthalmically compatible and contain at least one primary or secondary amino group, at least one carboxyl group, and/or at least one thiol group.

A preferred class of hydrophilicity-enhancing agents include without limitation: primary amino-, secondary amino-, carboxyl- or thiol-containing monosaccharides (e.g., 3-amino-1,2-propanediol, 1-thiolglycerol, 5-keto-D-gluconic acid, galactosamine, glucosamine, galacturonic acid, gluconic acid, glucosaminic acid, mannosamine, saccharic acid 1,4-lactone, saccharide acid, Ketodeoxynonulosonic acid, N-methyl-D-glucamine, 1-amino-1-deoxy-β-D-galactose, 1-amino-1-deoxysorbitol, 1-methylamino-1-deoxysorbitol, N-aminoethyl gluconamide); primary amino-, secondary amino-, carboxyl- or thiol-containing disaccharides (e.g., chondroitin disaccharide sodium salt, di(β-D-xylopyranosyl)amine, digalacturonic acid, heparin disaccharide, hyaluronic acid disaccharide, Lactobionic acid); and primary amino-, secondary amino-, carboxyl- or thiol-containing oligosaccharides (e.g., carboxymethyl-β-cyclodextrin sodium salt, trigalacturonic acid); and combinations thereof.

Another preferred class of hydrophilicity-enhancing agents is hydrophilic polymers having one or more (primary or secondary) amino, carboxyl and/or thiol groups. More preferably, the content of the amino (—NHR' with R' as defined above), carboxyl (—COOH) and/or thiol (—SH) groups in a hydrophilic polymer as a hydrophilicity-enhancing agent is less than about 40%, preferably less than about 30%, more preferably less than about 20%, even more preferably less than about 10%, by weight based on the total weight of the hydrophilic polymer.

One preferred class of hydrophilicity-enhancing agents are (primary or secondary) amino- or carboxyl-containing polysaccharides, for example, such as, carboxymethylcellulose (having a carboxyl content of about 40% or less, which is estimated based on the composition of repeating units, —[$C_6H_{10-m}O_5(CH_2CO_2H)_m$]— in which m is 1 to 3), carboxyethylcellulose (having a carboxyl content of about 36% or less, which is estimated based on the composition of repeating units, —[$C_6H_{10-m}O_5(C_2H_4CO_2H)_m$]— in which m is 1 to 3) carboxypropylcellulose (having a carboxyl content of about 32% or less, which is estimated based on the composition of repeating units, —[$C_6H_{10-m}O_5(C_3H_6CO_2H)_m$]—, in which m is 1 to 3), hyaluronic acid (having a carboxyl content of about 11%, which is estimated based on the composition of repeating units, —($C_{13}H_{20}O_9NCO_2H$)—), chondroitin sulfate (having a carboxyl content of about 9.8%, which is estimated based on the composition of repeating units, —($C_{12}H_{18}O_{13}NSCO_2H$)—), or combinations thereof.

Another preferred class of hydrophilicity-enhancing agents include without limitation: poly(ethylene glycol) (PEG) with mono-amino (primary or secondary amino), carboxyl or thiol group (e.g., PEG-NH$_2$, PEG-SH, PEG-COOH); H$_2$N-PEG-NH$_2$; HOOC-PEG-COOH; HS-PEG-SH; H$_2$N-PEG-COOH; HOOC-PEG-SH; H$_2$N-PEG-SH; multi-arm PEG with one or more amino (primary or secondary), carboxyl or thiol groups; PEG dendrimers with one or more amino (primary or secondary), carboxyl or thiol groups; a diamino-(primary or secondary) or dicarboxyl-terminated homo- or co-polymer of a non-reactive hydrophilic vinylic monomer; a monoamino—(primary or secondary) or monocarboxyl-terminated homo- or co-polymer of a non-reactive hydrophilic vinylic monomer (any one of those described above) or a phosphorylcholine-containing vinylic monomer (any one of those described above); a copolymer which is a polymerization product of a composition comprising (1) about 60% by weight or less, preferably from about 0.1% to about 30%, more preferably from about 0.5% to about 20%, even more preferably from about 1% to about 15%, by weight of one or more reactive vinylic monomers and (2) at least one non-reactive hydrophilic vinylic monomer; and combinations thereof.

In accordance with the invention, reactive vinylic monomers can be carboxyl-containing vinylic monomers (any those preferred examples described above), primary amino-containing vinylic monomers (any those preferred examples described above), or secondary amino-containing vinylic monomers (any those preferred examples described above).

More preferably, a hydrophilicity-enhancing agent is PEG-NH$_2$; PEG-SH; PEG-COOH; H$_2$N-PEG-NH$_2$; HOOC-PEG-COOH; HS-PEG-SH; H$_2$N-PEG-COOH; HOOC-PEG-SH; H$_2$N-PEG-SH; multi-arm PEG with one or more amino, carboxyl or thiol groups; PEG dendrimers with one or more amino, carboxyl or thiol groups; a monoamino-, monocarboxyl-, diamino- or dicarboxyl-terminated homo- or copolymer of a non-reactive hydrophilic vinylic monomer selected from the group consisting of (meth)acryamide, N-vinylpyrrolidone (NVP), N-vinyl-N-methyl acetamide, glycerol (meth)acrylate, hydroxyethyl (meth)acrylate, N-hydroxyethyl (meth)acrylamide, N-hydroxypropyl (meth)acrylamide, $C_1$-$C_4$-alkoxy polyethylene glycol (meth)acrylate having a weight average molecular weight of up to 400 Daltons, vinyl alcohol, N-methyl-3-methylene-2-pyrrolidone, 1-methyl-5-methylene-2-pyrrolidone, 5-methyl-3-methylene-2-pyrrolidone, N,N-dimethylaminoethyl (meth)acrylate, N,N-dimethylaminopropyl (metha)crylamide, a phosphorylcholine-containing vinylic monomer, and combinations thereof; a copolymer which is a polymerization product of a composition comprising (1) from about 0.1% to about 30%, preferably from about 0.5% to about 20%, more preferably from about 1% to about 15%, by weight of acrylic acid, $C_1$-$C_3$ alkylacrylic acid, allylamine and/or amino-$C_2$-$C_4$ alkyl (meth)acrylate, and (2) at least one non-reactive hydrophilic vinylic monomer selected from the group consisting of acryamide, N,N-dimethylacrylamide, N-vinylpyrrolidone, a phosphorylcholine-containing vinylic monomer, N-vinyl-N-methyl acetamide, glycerol (meth)acrylate, hydroxyethyl (meth)acrylate, N-hydroxyethyl (meth)acrylamide, $C_1$-$C_4$-alkoxy polyethylene glycol (meth)acrylate having a weight average molecular weight of up to 400 Daltons, vinyl alcohol, and combination thereof.

Examples of preferred non-reactive phosphorylcholine-containing vinylic monomers include without limitation (meth)acryloyloxyethyl phosphorylcholine (aka, MPC, or 2-((meth)acryloyloxy)ethyl-2'-(trimethylammonio)ethylphosphate), (meth)acryloyloxypropyl phosphorylcholine (aka, 3-((meth)acryloyloxy)propyl-2'-(trimethylammonio) ethylphosphate), 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio) ethylphosphate, 4-[(meth)acryloylamino]butyl-2'-(trimethylammonio)ethylphosphate, 5-((meth)acryloyloxy)pentyl-2'-(trimethylammonio) ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio) ethylphosphate, 2-((meth)acryloyloxy)pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)-ethylphosphate, 2-(allyloxycarbonylamino)ethyl-2'-(trimethylammonio)ethyl phosphate, 2-(butenoyloxy)ethyl-2'-(trimethylammonio)ethylphosphate, those described in U.S. Pat. No. 5,461,433 (herein incorporated by reference in its entirety), and combinations thereof.

Most preferably, a hydrophilicity-enhancing agent is PEG-NH$_2$; PEG-SH; PEG-COOH; monoamino-, monocarboxyl-, diamino- or dicarboxyl-terminated polyvinylpyrrolidone; monoamino-, monocarboxyl-, diamino- or dicarboxyl-terminated polyacrylamide; monoamino-, monocarboxyl-, diamino- or dicarboxyl-terminated poly(DMA); monoamino- or monocarboxyl-, diamino- or dicarboxyl-terminated poly(DMA-co-NVP); monoamino-, monocarboxyl-, diamino- or dicarboxyl-terminated poly(NVP-co-N,N-dimethylaminoethyl (meth)acrylate)); monoamino-, monocarboxyl-, diamino- or dicarboxyl-terminated poly(vinylalcohol); monoamino-, monocarboxyl-, diamino- or dicarboxyl-terminated poly[(meth)acryloyloxyethyl phosphrylcholine] homopolymer or copolymer; monoamino-, monocarboxyl-, diamino- or dicarboxyl-terminated poly(NVP-co-vinyl alcohol); monoamino-, monocarboxyl-, diamino- or dicarboxyl-terminated poly(N,N-dimethylacrylamide-co-vinyl alcohol); poly[(meth)acrylic acid-co-acrylamide] with from about 0.1% to about 30%, preferably from about 0.5% to about 20%, more preferably from about 1% to about 15%, by weight of (meth)acrylic acid; poly[(meth)acrylic acid-co-NVP] with from about 0.1% to about 30%, preferably from about 0.5% to about 20%, more preferably from about 1% to about 15%, by weight of (meth)acrylic acid; a copolymer which is a polymerization product of a composition comprising (1) a phosphorylcholine-containing vinylic monomer and (2) from about 0.1% to about 30%, preferably from about 0.5% to about 20%, more preferably from about 1% to about 15%, by weight of acrylic acid, $C_1$-$C_3$ alkylacrylic acid, allylamine and/or amino-$C_2$-$C_4$alkyl (meth)acrylate; and combination thereof.

PEGs with functional groups and multi-arm PEGs with functional groups can be obtained from various commercial suppliers, e.g., Polyscience, and Shearwater Polymers, inc., etc.

Monoamino-, monocarboxyl-, diamino- or dicarboxyl-terminated homo- or copolymers of one or more non-reactive hydrophilic vinylic monomers or of a phosphorylcholine-containing vinylic monomer can be prepared according to procedures described in U.S. Pat. No. 6,218,508, herein incorporated by reference in its entirety. For example, to prepare a diamino- or dicarboxyl-terminated homo- or co-polymer of a non-reactive hydrophilic vinylic monomer, the non-reactive vinylic monomer, a chain transfer agent with an primary or secondary amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomer are copolymerized (thermally or actinically) with a reactive vinylic monomer (having a primary or secondary amino or carboxyl group), in the presence of an free-radical initiator. Generally, the molar ratio of chain transfer agent to that of all of vinylic monomers other than the reactive vinylic monomer is from about 1:5 to about 1:100, whereas the molar ratio of chain transfer agent to the reactive vinylic monomer is 1:1. In such preparation, the chain transfer agent with primary or secondary amino or carboxyl group is used to control the molecular weight of the resultant hydrophilic polymer and forms a terminal end of the resultant hydrophilic polymer so as to provide the resultant hydrophilic polymer with one terminal primary or secondary amino or carboxyl group, while the reactive vinylic monomer provides the other terminal carboxyl or primary or secondary amino group to the resultant hydrophilic polymer. Similarly, to prepare a monoamino- or monocarboxyl-terminated homo- or co-polymer of a non-reactive hydrophilic vinylic monomer, the non-reactive vinylic monomer, a chain transfer agent with a primary or secondary amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomers are copolymerized (thermally or actinically) in the absence of any reactive vinylic monomer.

Copolymers comprising a non-reactive hydrophilic vinylic monomer and a reactive vinylic monomer (e.g., a carboxyl-containing vinylic monomer, a primary amino group-containing vinylic monomer or a secondary amino group-containing vinylic monomer) can be prepared according to any well-known radical polymerization methods or obtained from commercial suppliers. Copolymers containing methacryloyloxyethyl phosphorylcholine and carboxyl-containing vinylic monomer (or amino-containing vinylic monomer) can be obtained from NOF Corporation (e.g., LIPIDURE®-A and -AF).

The weight average molecular weight $M_w$ of the hydrophilic polymer having at least one amino, carboxyl or thiol group (as a hydrophilicity-enhancing agent) is preferably from about 500 to about 5,000,000, more preferably from about 1,000 to about 2,000,000, even more preferably from about 5,000 to about 1,000,000 Daltons.

Water-soluble and thermally-crosslinkable hydrophilic polymeric materials can be prepared according to the processes disclosed in U.S. Pat. Appli. Pub. Nos. US 2016/0061995 A1 and US2013/0337160 A1 (herein incorporated by reference in their entireties) and in U.S. Pat. No. 8,529,057 (herein incorporated by reference in its entirety).

In a preferred embodiment, a water-soluble thermally-crosslinkable polymeric material can be obtained by heating an aqueous reactive solution, which comprises at least one azetidinium-containing polymer and at least one hydrophilicity-enhancing agent (i.e., a wetting agent) having at least one reactive functional group selected from the group consisting of primary amino group, secondary amino group, carboxyl group, thiol group, and a combination thereof, to a temperature of from about 35° C. to about 85° C. and maintaining the temperature for a period of time sufficient (about 6 hours or less, preferably about 5 hours, more preferably from about 2 hour to about 4 hours). The aqueous reactive solution preferably comprises from about 70 mM to about 170 mM (preferably about 90 mM to about 150 mM, more preferably from about 100 mM to about 130 mM) of one or more ionic compounds and a pH of at least 8.0 (preferably at least 8.5, more preferably at least 9.0, even more preferably at least 9.5). It should be understood that the reaction time should be long enough to covalently attach the hydrophilicity-enhancing agent onto the polymer chain of the azetidinium-containing polymer, but should be short enough not to consume all the azetidinium groups of the azetidinium-containing polymer and not to form a gel (i.e., not water-soluble) due to the too many crosslinkages formed between the azetidinium-containing polymer and the hydrophilicity-enhancing agent. A resultant polymeric material is a lightly-crosslinked polymeric material which has a highly-branched structure and still comprises thermally-crosslinkable azetidinium groups.

A person skilled in the art understands well how to adjust the pH of the reactive mixture, e.g., by adding a base (e.g., NaOH, KOH, NH$_4$OH, or mixture thereof) or an acid (e.g., HCl, H$_2$SO$_4$, H$_3$PO$_4$, citric acid, acetic acid, boric acid, or mixture thereof).

In accordance with the invention, any ionic compounds can be used in the reactive mixture. Preferably, ionic compounds are those used as ionic tonicity-adjusting agents and ionic buffering agents used in an ophthalmic solutions. Examples of preferred ionic tonicity-adjusting agents includes without limitation sodium chloride, potassium chloride, and combinations thereof. Examples of preferred ionic buffering agents includes various salts of phosphoric acid (e.g. NaH$_2$PO$_4$, Na$_2$HPO$_4$, Na$_3$PO$_4$, KH$_2$PO$_4$, K$_2$HPO$_4$, K$_3$PO$_4$, or mixtures thereof), various salts of boric acid (e.g., sodium borate, potassium borate, or mixture thereof), various salts of citric acid (e.g., monosodium citrate, disodium citrate, trisodium citrate, monopotassium citrate, dipotassium citrate, tripotassium citrate, or mixtures thereof), various salts of carbonic acid (e.g., Na$_2$CO$_3$, NaHCO$_3$, K$_2$CO$_3$, KHCO$_3$, or mixture thereof).

The aqueous reactive solution for preparing a water-soluble thermally-crosslinkable polymeric material can be prepared by dissolving a desired amount of an azetidinium-containing polymer, a desired amount of a hydrophilicity-enhancing agent with at least one reactive functional group, and desired amounts of other components (e.g., ionic buffering agents, ionic tonicity-adjusting agents, etc.) in water (or a mixture of water and a minority amount of a water-soluble organic solvent) to form an aqueous solution and then adjusting the pH of the aqueous solution if necessary.

In accordance with the invention, the concentration ratio of a hydrophilicity-enhancing agent relative to an azetidinium-containing polymer in the aqueous reactive solution must be selected not to render a resultant water-soluble thermally-crosslinkable polymeric material water-insoluble (i.e., a solubility of less than 0.005 g per 100 ml of water at room temperature) and not to consume more than about 99%, preferably about 98%, more preferably about 97%, even more preferably about 96% of the azetidinium groups of the azetidinium-containing polymer.

In a preferred embodiment, the aqueous reactive solution comprises from 0.01% to about 10% by weight (preferably from 0.05% to about 5% by weight, more preferably from 0.08% to about 1% by weight, even more preferably from 0.1% to about 0.4% by weight) of an azetidinium-containing polymer and from about 0.01% to about 10% by weight (preferably from 0.02% to about 5% by weight, more preferably from 0.05% to about 2% by weight, even more preferably from 0.08% to about 1.0% by weight) of a hydrophilicity-enhancing agent having at least one reactive function group (carboxyl, primary amino, secondary amino group), the concentration ratio of the azetidinium-containing polymer to the hydrophilicity-enhancing agent is from about 1000:1 to 1:1000 (preferably from about 500:1 to about 1:500, more preferably from about 250:1 to about 1:250, even more preferably from about 100:1 to about 1:100).

In a preferred embodiment, the water-soluble thermally-crosslinkable polymeric material comprises (i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of hydrophilic moieties or second polymer chains derived from at least one hydrophilicity-enhancing agent having at least one reactive functional group selected from the group consisting of primary amino group, secondary amino group, carboxyl group, thiol group, and combination thereof (preferably carboxyl groups), wherein the hydrophilic moieties or second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one amino, carboxyl or thiol group of the hydrophilicity-enhancing agent, and (iii) azetidinium groups which are parts of the first polymer chains or pendant or terminal groups covalently attached to the first polymer chains. The composition of the water-soluble thermally-crosslinkable polymeric material is determined by the composition (based on the total weight of the reactants) of a reactant mixture used for such a polymer according to the crosslinking reactions shown in Scheme I above. For example, if a reactant mixture comprises about 75% by weight of a polyamidoamine-epichlorohydrin and about 25% by weight of at least one hydrophilicity-enhancing agent based on the total weight of the reactants (excluding solvent), then the resultant chemically-modified polyamidoamine-epichlorohydrin comprises about 75% by weight of first polymer chains derived from the polyamioamine-epichlorohydrin and about 25% by weight of hydrophilic moieties or second polymer chains derived from said at least one hydrophilicity-enhancing agent.

Preferably, the step of heating is performed by autoclaving the colored contact lens precursor in the second aqueous coating solution which is a packaging solution (i.e., a buffered aqueous solution with a pH of from 6.7 to 7.6) in a sealed lens package at a temperature of from about 115° C. to about 125° C. for approximately 20-90 minutes. It is believed that during autoclave those azetidinium groups which do not participate in crosslinking reaction may be hydrolyzed into 2,3-dihydroxypropyl (HO—CH$_2$—CH(OH)—CH$_2$—) groups and that the azetidinium-containing polymeric material present in the lens packaging solution, if applicable, can be converted to a non-reactive polymeric wetting agent capable of improving a lens's insert comfort. Consequently, the second aqueous coating solution is ophthalmically safe after autoclave.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

In accordance with the invention, a packaging solution contains at least one buffering agent and one or more other ingredients known to a person skilled in the art. Examples of other ingredients include without limitation, tonicity agents, surfactants, antibacterial agents, preservatives, and lubricants (e.g., cellulose derivatives, polyvinyl alcohol, polyvinyl pyrrolidone).

The packaging solution contains a buffering agent in an amount sufficient to maintain a pH of the packaging solution in the desired range, for example, preferably in a physiologically acceptable range of about 6.5 to about 7.5. Any known, physiologically compatible buffering agents can be used. Suitable buffering agents as a constituent of the contact lens care composition according to the invention are known to the person skilled in the art. Examples are boric acid, borates, e.g. sodium borate, citric acid, citrates, e.g. potassium citrate, bicarbonates, e.g. sodium bicarbonate, TRIS (2-amino-2-hydroxymethyl-1,3-propanediol), Bis-Tris (Bis-(2-hydroxyethyl)-imino-tris-(hydroxymethyl)-methane), bis-aminopolyols, triethanolamine, ACES (N-(2-hydroxyethyl)-2-aminoethanesulfonic acid), BES (N,N-Bis(2-hydroxyethyl)-2-aminoethanesulfonic acid), HEPES (4-(2-hydroxyethyl)-1-piperazineethanesulfonic acid), MES (2-(N-morpholino)ethanesulfonic acid), MOPS (3-[N-morpholino]-propanesulfonic acid), PIPES (piperazine-N,N'-bis(2-ethanesulfonic acid), TES (N-[Tris(hydroxymethyl)methyl]-2-aminoethanesulfonic acid), salts thereof, phosphate buffers, e.g. Na$_2$HPO$_4$, NaH$_2$PO$_4$, and KH$_2$PO$_4$ or mixtures thereof. Preferably, the buffering agents are phosphate buffers, borate buffers, or combinations thereof. The amount of each buffer agent in a packaging solution is preferably from 0.001% to 2%, preferably from 0.01% to 1%; most preferably from about 0.05% to about 0.30% by weight.

The packaging solution has a tonicity of from about 200 to about 450 milliosmol (mOsm), preferably from about 250 to about 350 mOsm. The tonicity of a packaging solution can be adjusted by adding organic or inorganic substances which affect the tonicity. Suitable occularly acceptable tonicity agents include, but are not limited to sodium chloride, potassium chloride, glycerol, propylene glycol, polyols, mannitols, sorbitol, xylitol and mixtures thereof.

A packaging solution of the invention has a viscosity of from about 1 centipoise to about 5 centipoises, at 25° C.

In a preferred embodiment, the packaging solution comprises preferably from about 0.01% to about 2%, more preferably from about 0.05% to about 1.5%, even more preferably from about 0.1% to about 1%, most preferably from about 0.2% to about 0.5%, by weight of a water-soluble thermally-crosslinkable hydrophilic polymeric material having azetidinium groups.

A packaging solution of the invention can contain a viscosity-enhancing polymer. The viscosity-enhancing polymer preferably is nonionic. Increasing the solution viscosity provides a film on the lens which may facilitate comfortable wearing of the contact lens. The viscosity-enhancing component may also act to cushion the impact on the eye surface during insertion and serves also to alleviate eye irritation.

Preferred viscosity-enhancing polymers include, but are not limited to, water soluble cellulose ethers (e.g., methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof), water-soluble polyvinylalcohols (PVAs), high molecular weight poly(ethylene oxide) having a molecular weight greater than about 2000 (up to 10,000,000 Daltons), polyvinylpyrrolidone with a molecular weight of from about 30,000 daltons to about 1,000,000 daltons, a copolymer of N-vinylpyrrolidone and at least one dialkylaminoalkyl (meth)acrylate having 7-20 carbon atoms, and combinations thereof. Water soluble cellulose ethers and copolymers of vinylpyrrolidone and dimethylaminoethylmethacrylate are most preferred viscosity-enhancing polymers. Copolymers of N-vinylpyrrolidone and dimethylaminoethylmethacrylate are commercially available, e.g., Copolymer 845 and Copolymer 937 from ISP.

The viscosity-enhancing polymer is present in the packaging solution in an amount of from about 0.01% to about 5% by weight, preferably from about 0.05% to about 3% by weight, even more preferably from about 0.1% to about 1% by weight, based on the total amount of the packaging solution.

A packaging solution can further comprises a polyethylene glycol having a molecular weight of about 1200 or less, more preferably 600 or less, most preferably from about 100 to about 500 daltons.

Where at least one of the crosslinked coating and the packaging solution contains a polymeric material having polyethylene glycol segments, the packaging solution preferably comprises an α-oxo-multi-acid or salt thereof in an amount sufficient to have a reduced susceptibility to oxidation degradation of the polyethylene glycol segments. A commonly-owned co-pending patent application (US patent application publication No. 2004/0116564 A1, incorporated herein in its entirety) discloses that oxo-multi-acid or salt thereof can reduce the susceptibility to oxidative degradation of a PEG-containing polymeric material.

Exemplary α-oxo-multi-acids or biocompatible salts thereof include without limitation citric acid, 2-ketoglutaric acid, or malic acid or biocompatible (preferably ophthalmically compatible) salts thereof. More preferably, an α-oxo-multi-acid is citric or malic acid or biocompatible (preferably ophthalmically compatible) salts thereof (e.g., sodium, potassium, or the like).

In accordance with the invention, the packaging solution can further comprises mucin-like materials, ophthalmically beneficial materials, and/or surfactants.

Exemplary mucin-like materials include without limitation polyglycolic acid, polylactides, and the likes. A mucin-like material can be used as guest materials which can be released continuously and slowly over extended period of time to the ocular surface of the eye for treating dry eye syndrome. The mucin-like material preferably is present in effective amounts.

Exemplary ophthalmically beneficial materials include without limitation 2-pyrrolidone-5-carboxylic acid (PCA), amino acids (e.g., taurine, glycine, etc.), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Surfactants can be virtually any ocularly acceptable surfactant including non-ionic, anionic, and amphoteric surfactants. Examples of preferred surfactants include without limitation poloxamers (e.g., Pluronic® F108, F88, F68, F68LF, F127, F87, F77, P85, P75, P104, and P84), poloamines (e.g., Tetronic® 707, 1107 and 1307, polyethylene glycol esters of fatty acids (e.g., Tween® 20, Tween® 80), polyoxyethylene or polyoxypropylene ethers of $C_{12}$-$C_{18}$ alkanes (e.g., Brij® 35), polyoxyethyene stearate (Myrj® 52), polyoxyethylene propylene glycol stearate (Atlas® G 2612), and amphoteric surfactants under the trade names Mirataine® and Miranol®.

It is believed that viscosity-enhancing polymer, a polyethylene glycol, a mucin-like material, an ophthalmically beneficial material, and a surfactant present in the packaging solution can be entrapped in the polymer matrix of the hydrogel coating and then release into the eye when being worn.

In accordance with a preferred embodiment of the invention, the elastic modulus ($E_{CHCA}$) of the colored contact lens is equal to the elastic modulus ($E_{PHCA}$) of the preformed hydrogel contact lens within a margin (designated ΔE %) of about ±10% or less (preferably about +8%, even more preferably about ±6%). The margin, ΔE %, is calculated according to the following equation.

$$\Delta E \% = \left| \frac{E_{CHCA} - E_{PHCA}}{E_{PHCA}} \right| \times 100\%$$

In another aspect, the invention provides a colored hydrogel contact lens which comprises: a hydrogel lens body having an opaque color image thereon and/or therein; and a coating which encloses the hydrogel lens body and the opaque color image, wherein the coating comprises an anchoring layer of a polyanionic polymer and a layer of a hydrogel material, wherein the polyanionic polymer is one or more homo- or copolymers of acrylic acid, methacrylic acid, ethylacrylic acid, or 2-(meth)acrylamidoglycolic acid, wherein the hydrogel material is derived from a water-soluble thermally-crosslinkable hydrophilic polymeric material having azetidinium groups and is covalently attached onto the anchoring layer of the polyanionic polymer through linkages each formed between one carboxyl group and one azetidinium group, wherein the colored contact lens in fully hydrated state has a friction rating of about 2 or lower (preferably about 1.5 or lower, more preferably about 1.0 or lower, even more preferably about 0.5 or lower) after 7 cycles of manual rubbing.

A hydrogel lens body has a 3-dimensional shape of a colored contact lens. In accordance with the invention, a preformed hydrogel contact lens having a color image thereon and/or therein becomes a hydrogel lens body after being subjected to a surface treatment (here a coating process described above).

In a preferred embodiment, the hydrogel lens body is a non-silicone hydrogel lens body. Preferably, the non-silicone hydrogel lens body is composed of a polymer having at least 50% by mole of repeating units of at least one hydroxyl-containing vinylic monomer, which is preferably selected from the group consisting of hydroxyethyl (meth)acrylate, hydroxypropyl (meth)acrylate, hydroxybutyl (meth)acrylate, glycerol (meth)acrylate, hydroxyethyl (meth)acrylamide, hydroxypropyl (meth)acrylamide, hydroxybutyl (meth)acrylamide, vinyl alcohol, allyl alcohol, and combinations thereof. More preferably, the polymer further comprises repeating units of at least one amide-containing vinylic monomer, which is preferably selected from the group consisting of (meth)acrylamide, N,N-dimethyl (meth)acrylamide, N-vinylpyrrolidone (NVP), N-vinyl formamide, N-vinyl acetamide, N-vinyl isopropylamide, N-vinyl-N-methyl acetamide, N,N-dimethylaminopropyl (meth)acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, and combinations thereof.

In another preferred embodiment, the hydrogel lens body is a polyvinylalcohol-based hydrogel contact lens body.

In another preferred embodiment, the hydrogel lens body is a silicone hydrogel lens body.

Preferably, the hydrogel contact lens body comprises a polymer matrix, a first leachable polymeric lubricant, and a second leachable polymeric lubricant, wherein the first and second leachable polymeric lubricants are not covalently attached to the polymer matrix but are distributed within the polymer matrix, wherein the second leachable polymeric lubricant has an average molecular weight being at least about 3 fold of the average molecular weight of the first leachable polymeric lubricant.

In accordance with the invention, the colored contact lens has a water content of preferably from about 15% to about 80%, more preferably from about 30% to about 70% by weight (at room temperature, about 22° C. to 28° C.), an elastic modulus of from about 0.2 MPa to about 1.5 MPa (preferably from about 0.3 MPa to about 1.2 MPa, more preferably from about 0.4 MPa to about 1.0 MPa) when being fully hydrated.

In a preferred embodiment, the coating of a colored contact lens of the invention has a thickness of at least 0.1 µm (preferably at least 0.5 µm, more preferably at least 1.0 µm, even more preferably from 2.0 µm to about 15 µm).

The average thickness of the coating can be determined from the AFM image of a cross section of a colored hydrogel contact lens of the invention, as well known to a person skilled in the art. A person skilled in the art knows well how to cut a contact lens.

All the various embodiments described above of a water-soluble thermally crosslinkable hydrophilic polymeric material are incorporated in this aspect of the invention.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A method for producing colored contact lenses, comprising the steps of:
(1) obtaining a preformed hydrogel contact lens having a hydrogel lens body and a color image printed with an ink on and/or in one of the anterior and posterior surface of the hydrogel lens body, wherein the ink comprises pigment particles and optionally one or more dyes;
(2) contacting the preformed hydrogel contact lens with a first aqueous coating solution of a polyanionic polymer at a pH of about 4.0 or less and at a coating temperature of from about 25° C. to about 80° C. to obtain a colored contact lens precursor which is the preformed hydrogel contact lens with the color image and a layer of the polyanionic polymer thereon, wherein the polyanionic polymer is one or more homo- or copolymers of acrylic acid, methacrylic acid, ethylacrylic acid, 2-acrylamidoglycolic acid, or 2-methacrylamidoglycolic acid, wherein the layer of the polyanionic polymer encloses the preformed hydrogel contact lens having the color image; and
(3) heating the colored contact lens precursor obtained in step (2), in a second aqueous coating solution which comprises a water-soluble and thermally-crosslinkable hydrophilic polymeric material having azetidinium groups, at a temperature of from about 60° C. to about 140° C. for at least 30 minutes to crosslink the water-soluble thermally-crosslinkable hydrophilic polymeric material and the polyanionic polymer so as to form the colored contact lens with a hydrogel coating which is covalently attached onto the layer of the polyanionic polymer, wherein the colored contact lens in fully hydrated state has a friction rating of about 2 or lower after 7 cycles of manual rubbing.

2. The method of invention 1, wherein the first aqueous coating solution has a pH of about 3.5 or less.

3. The method of invention 1, wherein the first aqueous coating solution has a pH of about 3.0 or less.

4. The method of invention 1, wherein the first aqueous coating solution has a pH of from about 0.5 to about 2.5.

5. The method of any one of inventions 1 to 4, wherein the coating temperature is from about 30° C. to about 75° C.

6. The method of any one of inventions 1 to 4, wherein the coating temperature is from about 35° C. to about 70° C.

7. The method of any one of inventions 1 to 4, wherein the coating temperature is from about 40° C. to about 60° C.

8. The method of any one of inventions 1 to 7, wherein the preformed hydrogel contact lens is in contact with the first aqueous coating solution for a contacting time of at least one minute.

9. The method of any one of inventions 1 to 7, wherein the preformed hydrogel contact lens is in contact with the first aqueous coating solution for a contacting time of at least 5 minutes.

10. The method of any one of inventions 1 to 7, wherein the preformed hydrogel contact lens is in contact with the first aqueous coating solution for a contacting time of at least 10 minutes.

11. The method of any one of inventions 1 to 7, wherein the preformed hydrogel contact lens is in contact with the first aqueous coating solution for a contacting time of at least 30 minutes.

12. The method of any one of inventions 1 to 11, wherein the step of heating is performed by autoclaving the colored contact lens precursor immersed in the second aqueous coating solution in a sealed lens package at a temperature of from about 115° C. to about 125° C. for about 30 minutes to about 90 minutes, wherein the second aqueous coating solution is a buffered aqueous solution with a pH of from 6.7 to 7.6.

13. The method of any one of inventions 1 to 12, wherein the elastic modulus of the colored contact lens is equal to the elastic modulus of the preformed hydrogel contact lens within a margin of about ±10% or less.

14. The method of any one of inventions 1 to 12, wherein the elastic modulus of the colored contact lens is equal to the elastic modulus of the preformed hydrogel contact lens within a margin of about ±8% or less.

15. The method of any one of inventions 1 to 12, wherein the elastic modulus of the colored contact lens is equal to the elastic modulus of the preformed hydrogel contact lens within a margin of about ±6% or less.

16. A colored contact lens, comprising: a hydrogel lens body having an opaque color image thereon and/or therein; and a coating which encloses the hydrogel lens body and the opaque color image, wherein the coating comprises an anchoring layer of a polyanionic polymer and a layer of a hydrogel material, wherein the polyanionic polymer is one or more homo- or copolymers of acrylic acid, methacrylic acid, ethylacrylic acid, 2-acrylamidoglycolic acid, or 2-methacrylamidoglycolic acid, wherein the hydrogel material is derived from a water-soluble thermally-crosslinkable hydrophilic polymeric material having azetidinium groups and is covalently attached onto the anchoring layer of the polyanionic polymer through linkages each formed between one carboxyl group and one azetidinium group, wherein the colored contact lens in fully hydrated state has a friction rating of about 2 or lower after 7 cycles of manual rubbing.

17. The colored contact lens of invention 16 or the method of any one of inventions 1 to 15, wherein the hydrogel lens body is a non-silicone hydrogel lens body.

18. The colored contact lens or the method of invention 17, wherein the non-silicone hydrogel lens body is composed of a first polymer comprising at least 50% by mole of repeating units of at least one hydroxyl-containing vinylic monomer.

19. The colored contact lens or the method of invention 18, wherein said at least one hydroxyl-containing vinylic monomer is selected from the group consisting of hydroxyethyl (meth)acrylate, 2-hydroxypropyl (meth)acrylate, 3-hydroxypropyl (meth)acrylate, glycerol (meth)acrylate, N-2-hydroxyethyl (meth)acrylamide, N-2-hydroxypropyl (meth) acrylamide, N-3-hydroxypropyl (meth)acrylamide, N,N-bis (hydroxyethyl) (meth)acrylamide, N-2,3-dihydroxypropyl (meth)acrylamide, N-tris(hydroxymethyl)methyl (meth) acrylamide, vinyl alcohol, allyl alcohol, and combinations thereof.

20. The colored contact lens or the method of invention 19, wherein the first polymer further comprises repeating units of at least one amide-containing vinylic monomer.

21. The colored contact lens or the method of invention 20, wherein said at least one amide-containing vinylic monomer is selected from the group consisting of (meth)acrylamide, N,N-dimethyl (meth)acrylamide, N-vinylpyrrolidone (NVP), N-vinyl formamide, N-vinyl acetamide, N-vinyl isopropylamide, N-vinyl-N-methyl acetamide, N,N-dimethylaminopropyl (meth)acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, and combinations thereof.

22. The colored contact lens or the method of invention 17, wherein the non-silicone hydrogel lens body is composed of a crosslinked product of a water-soluble, actinically-crosslinkable polyvinyl alcohol prepolymer.

23. The colored contact lens or the method of invention 22, wherein the water-soluble, actinically-crosslinkable polyvinyl alcohol prepolymer comprises:
at least 60% by mole of repeating units of vinyl alcohol

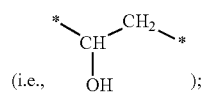

(i.e., $\overset{*}{\underset{}{\text{CH}}}\overset{\text{CH}_2}{\underset{\text{OH}}{\diagdown}}*$ );

from about 1% to about 25% by mole of repeating units of formula (I); and

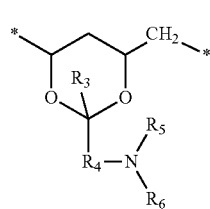

(I)

in which:
$R_3$ is hydrogen or a $C_1$-$C_6$ alkyl group;
$R_4$ is a $C_1$-$C_6$ alkylene divalent radical;
$R_5$ is hydrogen or $C_1$-$C_6$ alkyl;
$R_6$ is an ethylenically unsaturated group of

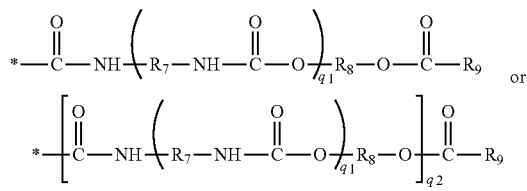

in which q1 and q2 independently of each another are zero or one, and $R_7$ and $R_8$ independently of one another are a $C_2$-$C_8$ alkylene divalent radical, $R_9$ is $C_2$-$C_8$ alkenyl.

24. The colored contact lens or the method of invention 23, wherein in formula (I) $R_3$ is hydrogen.

25. The colored contact lens or the method of invention 23 or 24, wherein in formula (I) $R_4$ is a $C_1$-$C_4$ alkylene divalent radical.

26. The colored contact lens or the method of invention 23 or 24, wherein in formula (I) $R_4$ is methylene or butylene divalent radical.

27. The colored contact lens or the method of invention 23 or 24, wherein in formula (I) $R_4$ is methylene divalent radical.

28. The colored contact lens or the method of any one of inventions 23 to 27, wherein in formula (I) $R_5$ is hydrogen or $C_1$-$C_4$ alkyl.

29. The colored contact lens or the method of any one of inventions 23 to 27, wherein in formula (I) $R_5$ is hydrogen or methyl or ethyl.

30. The colored contact lens or the method of any one of inventions 23 to 27, wherein in formula (I) $R_5$ is hydrogen or methyl.

31. The colored contact lens or the method of any one of inventions 23 to 30, wherein in formula (I) $R_4$ is methylene divalent radical, $R_5$ is hydrogen or $C_1$-$C_4$ alkyl, $R_3$ is hydrogen, and $R_6$ is a radical of

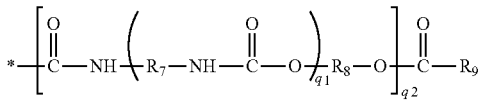

in which q2 is zero, $R_9$ is vinyl (*—CH=$CH_2$) or 1-methylethenyl (*—C($CH_3$)=$CH_2$).

32. The colored contact lens or the method of any one of inventions 23 to 31, wherein the polyvinylalcohol prepolymer has a weight average molecular weight of at least 2,000

Daltons, and comprises from about 2% to about 15% by mole of the repeating units of formula (I).

33. The colored contact lens of invention 16 or the method of any one of inventions 1 to 15, wherein the hydrogel lens body is a silicone hydrogel lens body.

34. The colored contact lens of any one of inventions 16 to 33 or the method of any one of inventions 1-15 and 17-33, wherein the hydrogel lens body comprises a polymer matrix and one or more leachable polymeric lubricants, wherein the leachable polymeric lubricants are not covalently attached to the polymer matrix but are distributed within the polymer matrix.

35. The colored contact lens or the method of invention 34, wherein the leachable polymeric lubricants are non-crosslinkable hydrophilic polymers selected from the group consisting of: polyvinyl alcohols (PVAs); polyamides; polyimides; polylactone; a homopolymer of N-vinylpyrrolidone; a copolymer of N-vinylpyrrolidone with one or more hydrophilic vinylic comonomers; a homopolymer of (meth)acrylamide; a copolymer of (meth)acrylamide with one or more hydrophilic vinylic monomers; a homopolymer of N-vinyl-N-methyl acetamide; a copolymer of N-vinyl-N-methyl acetamide with one or more hydrophilic vinylic monomers; a homopolymer of $C_2$-$C_3$ hydroxylalkyl (meth)acrylamide; a copolymer of $C_2$-$C_3$ hydroxylalkyl (meth)acrylamide with one or more hydrophilic vinylic monomer; a copolymer of a phosphrylcholine-containing vinylic monomer with one or more hydrophilic vinylic monomers; poly(ethylene oxide) (PEO); poly(2-ethyl oxazoline); heparin polysaccharides; polysaccharides; and mixtures thereof.

36. The colored contact lens of any one of inventions 16-35 or the method of any one of inventions 1-15 and 17-35, wherein the colored contact lens in fully hydrated state has a friction rating of about 1.5 or lower after 7 cycles of manual rubbing.

37. The colored contact lens of any one of inventions 16-35 or the method of any one of inventions 1-15 and 17-35, wherein the colored contact lens in fully hydrated state has a friction rating of about 1.0 or lower after 7 cycles of manual rubbing.

38. The colored contact lens of any one of inventions 16-35 or the method of any one of inventions 1-15 and 17-35, wherein the colored contact lens in fully hydrated state has a friction rating of about 0.5 or lower after 7 cycles of manual rubbing.

39. The colored contact lens of any one of inventions 16-38 or the method of any one of inventions 1-15 and 17-38, wherein the colored contact lens has a water content of from about 15% to about 80% by weight (at room temperature, about 22° C. to 28° C.) when being fully hydrated.

40. The colored contact lens of any one of inventions 16-38 or the method of any one of inventions 1-15 and 17-38, wherein the colored contact lens has a water content of from about 30% to about 70% by weight (at room temperature, about 22° C. to 28° C.) when being fully hydrated.

41. The colored contact lens of any one of inventions 16-40 or the method of any one of inventions 1-15 and 17-40, wherein the colored contact lens has an elastic modulus of from about 0.2 MPa to about 1.5 MPa when being fully hydrated.

42. The colored contact lens of any one of inventions 16-40 or the method of any one of inventions 1-15 and 17-40, wherein the colored contact lens has an elastic modulus of from about 0.3 MPa to about 1.2 MPa when being fully hydrated.

43. The colored contact lens of any one of inventions 16-40 or the method of any one of inventions 1-15 and 17-40, wherein the colored contact lens has an elastic modulus of from about 0.4 MPa to about 1.0 MPa when being fully hydrated.

44. The colored contact lens of any one of inventions 16-43 or the method of any one of inventions 1-15 and 17-43, wherein the coating has a thickness of at least 0.1 μm.

45. The colored contact lens of any one of inventions 16-43 or the method of any one of inventions 1-15 and 17-43, wherein the coating has a thickness of at least 0.5 μm.

46. The colored contact lens of any one of inventions 16-43 or the method of any one of inventions 1-15 and 17-43, wherein the coating has a thickness of from about 1.0 μm to about 15 μm.

47. The colored contact lens of any one of inventions 16-46 or the method of any one of inventions 1-15 and 17-46, wherein the polyanionic polymer is poly(acrylic acid) (PAA), poly(methacrylic acid) (PMAA), poly(acrylic acid-co-methacrylic acid) (pAA-pMAA), poly(ethylacrylic acid) (PEAA), poly(acrylic acid-co-ethylacrylic acid) (pAA-pEAA), poly(methacrylic acid-co-ethylacrylic acid) (pMAA-pEAA), poly[2-acrylamidoglycolic acid], poly[2-methacrylamidoglycolic acid], or a combination thereof.

48. The colored contact lens of any one of inventions 16-46 or the method of any one of inventions 1-15 and 17-46, wherein the polyanionic polymer is poly(acrylic acid) (PAA), poly(methacrylic acid) (PMAA), poly(acrylic acid-co-methacrylic acid) (pAA-pMAA), or a combination thereof.

49. The colored contact lens or the method of invention 47 or 48, wherein the polyanionic polymer has a weight average molecular weight of at least 100,000 Daltons.

50. The colored contact lens or the method of invention 47 or 48, wherein the polyanionic polymer has a weight average molecular weight of from 200,000 to 10,000,000 Daltons.

51. The colored contact lens or the method of invention 47 or 48, wherein the polyanionic polymer has a weight average molecular weight of from 300,000 to 5,000,000 Daltons.

52. The colored contact lens or the method of invention 47 or 48, wherein the polyanionic polymer has a weight average molecular weight of from 400,000 to 3,000,000 Daltons.

53. The colored contact lens of any one of inventions 16-52 or the method of any one of inventions 1-15 and 17-52, wherein the water-soluble thermally-crosslinkable polymeric material comprises (i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of hydrophilic moieties each derived from at least one first hydrophilicity-enhancing agent having at least one reactive functional group selected from the group consisting of primary amino group, secondary amino group, carboxyl group, thiol group, and combination thereof (preferably carboxyl groups), wherein the hydrophilic moieties are covalently attached to the first polymer chains through one or more covalent linkages each formed between one azetitdinium group of the polyamidoamine-epichlorohydrin and one amino, carboxyl or thiol group of the first hydrophilicity-enhancing agent, and (iii) azetidinium groups which are parts of the first polymer chains or pendant or terminal groups covalently attached to the first polymer chains.

54. The colored contact lens of any one of inventions 16-52 or the method of any one of inventions 1-15 and 17-52, wherein the water-soluble thermally-crosslinkable polymeric material comprises (i) from about 20% to about 95% by weight of first polymer chains derived from a polyamidoamine-epichlorohydrin or a poly(2-oxazoline-co-ethyleneimine)-epichlorohydrin,
(ii) from about 5% to about 80% by weight of second polymer chains each derived from at least one second hydrophilicity-enhancing agent having at least one reactive functional group selected from the group consisting of primary amino group, secondary amino group, carboxyl group, thiol group, and combination thereof (preferably carboxyl groups), wherein the second polymer chains are covalently attached to the first polymer chains through one or more covalent linkages each formed between one azetitdinium group of the polyamidoamine-epichlorohydrin and one amino, carboxyl or thiol group of the second hydrophilicity-enhancing agent, and
(iii) azetidinium groups which are parts of the first polymer chains or pendant or terminal groups covalently attached to the first polymer chains.

55. The colored contact lens or the method of invention 53, wherein the first hydrophilicity-enhancing agent is a primary amine-containing monosaccharide, a secondary amine-containing monosaccharide, a carboxyl-containing monosaccharide, a thiol-containing monosaccharide, a primary amine-containing disaccharide, a secondary amine-containing disaccharide, a carboxyl-containing disaccharide, a thiol-containing disaccharide, a primary amine-containing oligosaccharide, a secondary amine-containing oligosaccharide, a carboxyl-containing oligosaccharide, a thiol-containing oligosaccharide, or a combination thereof.

56. The colored contact lens or the method of invention 54, wherein the second hydrophilicity-enhancing agent is: a polyethylene glycol having one sole amino, carboxyl or thiol group; a polyethylene glycol with two terminal amino, carboxyl and/or thiol groups; a multi-arm polyethylene glycol with one or more amino, carboxyl and/or thiol groups; a polyethylene glycol dendrimer with one or more amino, carboxyl and/or thiol groups.

57. The colored contact lens or the method of invention 54, wherein the second hydrophilicity-enhancing agent is a copolymer which is a polymerization product of a composition comprising (1) about 60% or less by weight of one or more reactive vinylic monomers and (2) one or more non-reactive hydrophilic vinylic monomers.

58. The colored contact lens or the method of invention 57, wherein said one or more reactive vinylic monomers are vinylic monomers having a carboxyl group.

59. The colored contact lens or the method of invention 58, wherein said one or more reactive vinylic monomers are selected from the group consisting of acrylic acid, $C_1$-$C_4$ alkylacrylic acid (e.g., methacrylic ethylacrylic acid, propylacrylic acid, butylacrylic acid), N-2-acrylamidoglycolic acid, beta methyl-acrylic acid (crotonic acid), alpha-phenyl acrylic acid, beta-acryloxy propionic acid, sorbic acid, angelic acid, cinnamic acid, 1-carboxyl-4-phenyl butadiene-1,3, itaconic acid, citraconic acid, mesaconic acid, glutaconic acid, aconitic acid, maleic acid, fumaric acid, tricarboxy ethylene, and combinations thereof.

60. The colored contact lens or the method of invention 58, wherein said one or more reactive vinylic monomers are acrylic acid, methylacrylic acid, or combinations thereof.

61. The colored contact lens or the method of invention 57, wherein said one or more reactive vinylic monomers are vinylic monomers having a primary or secondary amino group.

62. The colored contact lens or the method of invention 61, wherein said one or more reactive vinylic monomers are amino-$C_2$-$C_6$ alkyl (meth)acrylate, $C_1$-$C_6$ alkylamino-$C_2$-$C_6$ alkyl (meth)acrylate, allylamine, vinylamine, amino-$C_2$-$C_6$ alkyl (meth)acrylamide, $C_1$-$C_6$ alkylamino-$C_2$-$C_6$ alkyl (meth)acrylamide, or combinations thereof.

63. The colored contact lens or the method of any one of inventions 57 to 62, wherein said one or more non-reactive vinylic monomers are selected from the group consisting of (meth)acrylamide, N,N-dimethyl (meth)acrylamide, N-vinylpyrrolidone (NVP), N-vinyl formamide, N-vinyl acetamide, N-vinyl isopropylamide, N-vinyl-N-methyl acetamide, N,N-dimethylaminoethyl (meth)acrylate, N,N-dimethylaminopropyl (meth)acrylamide, glycerol (meth)acrylate, N-2-hydroxyethyl (meth)acrylamide, N-2-hydroxypropyl (meth)acrylamide, N-3-hydroxypropyl (meth)acrylamide, N,N-bis(hydroxyethyl) (meth)acrylamide, N-2,3-dihydroxypropyl (meth)acrylamide, N-tris(hydroxymethyl)methyl (meth)acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, $C_1$-$C_4$-alkoxy polyethylene glycol (meth)acrylate having a weight average molecular weight of up to 1500 Daltons, allyl alcohol, vinyl alcohol, and combinations thereof.

64. The colored contact lens or the method of any one of inventions 57 to 62, wherein said one or more non-reactive vinylic monomers are selected from the group consisting of acryamide, N,N-dimethylacrylamide, N-vinylpyrrolidone, a phosphorylcholine-containing vinylic monomer, N-vinyl-N-methyl acetamide, glycerol (meth)acrylate, hydroxyethyl (meth)acrylate, N-hydroxyethyl (meth)acrylamide, $C_1$-$C_4$-alkoxy polyethylene glycol (meth)acrylate having a weight average molecular weight of up to 400 Daltons, vinyl alcohol, and combination thereof.

65. The colored contact lens or the method of any one of inventions 57 to 62, wherein said one or more non-reactive vinylic monomers are phosphorylcholine-containing vinylic monomers.

66. The colored contact lens or the method of any one of inventions 57 to 62, wherein said one or more non-reactive vinylic monomers are methacryloyloxyethyl phosphorylcholine.

67. The colored contact lens or the method of any one of inventions 57 to 66, wherein the composition comprises about 50% or less by weight of said one or more reactive vinylic monomers.

68. The colored contact lens or the method of any one of inventions 57 to 66, wherein the composition comprises from about 0.1% to about 30% by weight of said one or more reactive vinylic monomers.

69. The colored contact lens or the method of any one of inventions 57 to 66, wherein the composition comprises from about 0.5% to about 20% by weight of said one or more reactive vinylic monomers.

70. The colored contact lens or the method of any one of inventions 57 to 66, wherein the composition comprises from about 1% to about 15% by weight of said one or more reactive vinylic monomers.

71. The colored contact lens or the method of invention 54, wherein the second hydrophilicity-enhancing agent is a primary amine-containing polysaccharide, a secondary amine-containing polysaccharide, a carboxyl-containing polysaccharide, hyaluronic acid, chondroitin sulfate, or a combination thereof.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Manually Rubbing Tests.

The lenses are manually rubbed according to product insert with RENU® multi-purpose lens care solution (or another multi-purpose lens care solution or a phosphate buffered saline) for 20 seconds and placed back to the lens case containing fresh lens care solution. The above procedure is repeated for a given times, e.g., from 1 to 30 times, (i.e., number of repetitions of manually rubbing tests which imitate cleaning and soaking cycles). As used in this application, the term "i cycles of manual rubbing" (e.g., 7 cycles of manual rubbing) means i times (e.g., 7 times) of repetitions of manual rubbing tests described above for imitating cleaning and soaking cycles.

Lubricity Evaluation.

The lubricity of a lens is evaluated by using a finger-felt lubricity test which characterizes qualitatively the slipperiness of a lens surface on a friction rating scale of from 0 to 4. The higher the friction rating is, the lower the slipperiness (or lubricity).

Commercial lenses: DAILIES® TOTAL1®; ACUVUE® OASYS™; ACUVUE® ADVANCE PLUS™; DAILIES® Aqua Comfort Plus®; and AIR OPTIX®, are assigned a friction rating (designated "FR" hereinafter) of 0, 1, 2, 3, and 4 respectively. They are used as standard lenses for determining the friction rating of a lens under test.

The samples are placed in PBS for at least two rinses of 30 minutes each and then transferred to fresh PBS before the evaluation. Before the evaluation, hands are rinsed with a soap solution, extensively rinsed with DI water and then dried with KimWipe® towels. The samples are handled between the fingers and a numerical number is assigned for each sample relative to the above standard lenses described above. For example, if lenses are determined to be only slightly better than AIR OPTIX® lenses, then they are assigned a number 3. The value of a friction rating is one obtained by averaging the results of at least two friction ratings of a contact lens by two or more persons and/or by averaging the friction ratings of two or more contact lenses (from the identical batch of lens production) by one person.

The finger lubricities (i.e., friction ratings) of a contact lens can be determined either directly out-of-pack (so-called "OOP lubricity" or "OOP friction rating") but after ≥30 min soaking in PBS) or after i cycles (e.g., 7 cycles) of manual rubbing (so-called "AiCMR lubricity" or "AiCMR friction rating") according to the procedures described above.

Surface Wettability Tests.

Water contact angle (WCA) on a contact lens is a general measure of the surface wettability of a contact lens. In particular, a low water contact angle corresponds to more wettable surface. Average contact angles (Sessile Drop) of contact lenses are measured using a VCA 2500 XE contact angle measurement device from AST, Inc., located in Boston, Mass. This equipment is capable of measuring advancing contact angles ($\theta_a$) or receding contact angles ($\theta_r$) or sessile (static) contact angles. Unless specified, water contact angle is sessile (static) contact angle. The measurements are performed on fully hydrated contact lenses and immediately after blot-drying as follows. A contact lens is removed from the vial and washed 3 times in ~200 ml of fresh DI water in order to remove loosely bound packaging additives from the lens surface. The lens is then placed on top of a lint-free clean cloth (Alpha Wipe TX1009), dabbed well to remove surface water, mounted on the contact angle measurement pedestal, blown dry with a blast of dry air and finally the sessile drop contact angle is automatically measured using the software provided by the manufacturer. The DI water used for measuring the contact angle has a resistivity >18MΩcm and the droplet volume used is 2 μl. Typically, uncoated silicone hydrogel lenses (after autoclave) have a sessile drop contact angle around 120 degrees. The tweezers and the pedestal are washed well with Isopropanol and rinsed with DI water before coming in contact with the contact lenses.

Water Break-Up Time (WBUT) Tests.

The surface hydrophilicity of lenses (after autoclave) is assessed by determining water break-up time and break-up rate on the surface of a contact lens according to a technique (iDDrOP) described by S. Bhamla in Langmuir, 31, 3820-3828, 2015 and by S. Bhamla and coworkers in Investigative Ophthalmology & Visual Science, 57, 949-958, 2016 (herein incorporated by references in their entireties). To start this process, the lens is placed on a submerged pedestal. After the lens is forced through a PBS-air interface, an overhead camera (with special lighting and filters) records the time the liquid interface begins to break up on the lens (water break-up time, or WBUT). In addition, how well the surface continues to hold the liquid after break-up can be measured (for example from 90% to 80% total liquid coverage which is equal to ratio of the wet area over the total area). The plot of the total liquid coverage vs time can be used to calculate the break up rate by determining the slope of the line.

TBO Uptake Test

Toluidine Blue O (TBO) is a positively charged dye that has often been used to quantify the concentration of negatively charged polymers. See, e.g., Hutter, J., *J. Soc. Cosmet. Chem.*, 42, 87-96, 1991; Roediger, S., *Anal. Chem.*, 83, 3379-3385, 2011; and Tiraferri, A., Elimelech, M, *J. Mem Sci*, 389, 499-508, 2012 (herein incorporated by references in their entireties).

To estimate the amount of negatively charged groups on the lens surface, lenses are placed in 10 ppm toluidine blue in a phosphate buffer solution (2 ml/well of a 24-wells culture plate) and incubated overnight. After the lenses are removed, the remaining TBO can be monitored by measuring the absorbance of the dye at 630 nm, thereby estimating the TBO uptake per lens. The TBO uptake per lens is proportional to the concentration of the negatively-charged groups on the lens surface.

TBO Staining Test

It is known that the color of a dye can be changed when the dye becomes stacked closely together in a strong changes (from blue to red) as the dye becomes stacked closely together in a strongly negatively charged polymer matrix (Jebaramya, J., Digest *J. Nano. Biostructures*, 4, 789-797, 2009, herein incorporated by reference in its entirety). This allows the presence and uniformity of the coating to be observed.

Lenses are placed in 10 ppm toluidine blue in a phosphate buffer solution (2 ml/well of a 24-wells culture plate) and incubated overnight. Then, the lenses are removed from wells and inspected for color changes. If the color of the dye changes from blue to purple or red (i.e., a red shift or metachromism), a densely-packed acidic IPC/anchor layer is formed on a lens surface. It is understood that the lenses involved in the TBO uptake test can be used in this test.

In addition, by observing the magnified images, the print quality or color can be inspected.

Example 2

Preparation of PAA Aqueous Solution.

An aqueous solution of polyacrylic acid (PAA) is prepared by adding adequate amount of PAA (Carpobol 907, Mw ~450K Daltons) in water (distilled or deionized water) to have a concentration of about 0.1% by weight. After PAA is fully dissolved, the pH is adjusted by adding ~1.87% formic acid to the PAA aqueous solution to about 2. The prepared PAA aqueous solution is filtered to remove any particulate or foreign matter.

Phosphate Buffered Saline (PBS)

A phosphate buffered saline is prepared by dissolving $NaH_2PO_4 \cdot H_2O$, $Na_2HPO_4 \cdot 2H_2O$, and in a given volume of purified water (distilled or deionized) to have the following composition: about 0.044 w/w % $NaH_2PO_4 \cdot H_2O$, about 0.388 w/w/% $Na_2HPO_4 \cdot 2H_2O$, and about 0.79 w/w % NaCl.

Phosphate Buffered (PB) without NaCl (PB, No NaCl)

(PB, No NaCl) may also be prepared using the same procedure for preparing PBS, but no NaCl is added.

IPC Saline.

Poly(AAm-co-AA)(90/10) partial sodium salt (~90% solid content, poly(AAm-co-AA) 90/10, Mw 200,000) is purchased from Polysciences, Inc. and used as received. polyamidoamine-epichlorohydrin (PAE) (Kymene, aqueous solutions of different solid contents) is purchased from Ashland and used as received. An IPC saline is prepared by dissolving about 0.132% w/w of poly(AAm-co-AA)(90/10) and about 0.11% w/w of PAE in PBS (about 0.044 w/w % $NaH_2PO_4 \cdot H_2O$, about 0.388 w/w/% $Na_2HPO_4 \cdot 2H_2O$, about 0.79 w/w % NaCl) and adjusting the pH to 7.2~7.4. The prepared IPC saline is pre-treated at about 65° C. for about 6 hours. After the heat pre-treatment, the IPC saline is cooled down back to room temperature. Up to 5 ppm hydrogen peroxide maybe added to the final IPC saline to prevent bioburden growth and the IPC saline is filtered using a 0.22 micron membrane filter.

Example 3

FreshLook® ONE-DAY (FL1) contact lenses, each of which comprises an opaque color image thereon, are from Alcon® and used in the example. FL1 lenses are removed from packages and rinsed with purified water (distilled or deionized water) and dipped in a PAA solution prepared in Example 2 at room temperature for 5 minutes, followed by 2 minutes rinse in purified water. The PAA-coated FL1 lenses are then placed in polypropylene blisters (i.e., lens packaging shells) (one lens per shell) with 0.6 mL of the IPC saline (half of the saline is added prior to inserting the lens). The blisters are then sealed with foil and autoclaved for about 45 minutes at about 121° C., forming a clear hydrogel coating on FL1 lenses. Each clear hydrogel coating encloses the FL1 lens body and the opaque color image.

Example 4

Concentration of Negatively-Charged Groups

The concentration of the negatively charged groups on lenses prepared in Example 3 is determined according to the TBO uptake test described in Example 1. As control, FL1 lenses (without a clear hydrogel coating thereon) are tested in parallel.

Where the TBO solution is exposed to a control lens, the absorbance 630 nm is found to be about 87% of the absorbance at 630 nm for the original TBO solution (10 ppm TBO). Based on this result, it is estimated that 2.6 μg of TBO is bound to each control lens. This is believed to be due to non-specific interaction of TBO with the lens bulk.

However, where the TBO solution is exposed to a testing lens (one prepared in Example 3), the absorbance 630 nm is found to be about 45% of the absorbance at 630 nm for the original TBO solution (10 ppm TBO). Based on this result, it is estimated that 11 μg of TBO is bound to each testing lens, indicating the presence of a relatively large amount of negatively charged groups on the lens surface (i.e., the presence of a PAA base coating and an IPC top coating).

By inspecting the magnified images (10×) of the testing lenses, it is observed that the print quality or color does not seem to be affected by the process of applying a clear hydrogel coating.

Water-Break Up Time and Rate

FIG. 1 shows the total liquid coverage as function of time for control lens (FreshLook® ONE-DAY) and a FreshLook® ONE-DAY lens modified to have a clear hydrogel coating thereon (i.e., a testing contact lens prepared in Example 3). Graphically, this example shows that the control lens has a shorter WBUT than the testing lens, and the water break-up rate (the slope of the line) is much more gradual for the testing lens. The testing lens holds the water much longer, compared to almost instantaneous break-up for the control lens.

The statistical analysis of the iDDrOP results is shown in Table 1. After measuring 3 spots for 3 lenses, the testing lens has a WBUT more than 5 times greater than the control lens. In addition, the time the testing lens holds the water after initial break up (from 90-80% liquid coverage) has improved almost 90 times.

TABLE 1

|  | WBUT (s) | stdev | Water hold time (s) | stdev |
|---|---|---|---|---|
| Control | 17.8 | 7.6 | 0.3 | 0.0 |
| Testing | 101.9 | 26.5 | 26.7 | 6.5 |

N = 3 lens, 3 spots each.
Water hold time is the time measured between 90 and 80% total liquid coverage.

Out-of-Pack Lubricity

The OOP lubricities (i.e., OOP friction ratings) of control lens (FreshLook® ONE-DAY) and a FreshLook® ONE-DAY lens modified to have a clear hydrogel coating thereon (i.e., a testing contact lens prepared in Example 3) are evaluated according to the procedures described in Example 1. It is found that the control lens has an OOP friction rating of 3 whereas the testing lens has an OOP friction rating of 0.

What is claimed is:

1. A method for producing soft contact lenses, comprising the steps of:
    (1) obtaining a preformed hydrogel contact lens having a hydrogel lens body and an opaque color image printed with an ink on and/or in one of the anterior and posterior surface of the hydrogel lens body, wherein the ink comprises pigment particles, wherein the opaque color image is a cosmetic pattern, wherein the hydrogel lens body is a non-silicone hydrogel lens body which is composed of a polymer comprising at least 50% by mole of repeating units of at least one hydroxyl-containing vinylic monomer;

(2) contacting the preformed hydrogel contact lens with a first aqueous coating solution of a polyanionic polymer at a pH of about 4.0 or less and at a coating temperature of from about 25° C. to about 80° C. to obtain a colored contact lens precursor which is the preformed hydrogel contact lens having a layer of the polyanionic polymer thereon, wherein the polyanionic polymer is one or more homo- or copolymers of acrylic acid, methacrylic acid, ethylacrylic acid, 2-acrylamidoglycolic acid, or 2-methacrylamidoglycolic acid, wherein the layer of the polyanionic polymer encloses the preformed hydrogel contact lens having the opaque color image; and (3) heating the colored contact lens precursor obtained in step (2), in a second aqueous coating solution which comprises a water-soluble and thermally-crosslinkable hydrophilic polymeric material having azetidinium groups, at a temperature of from about 60° C. to about 140° C. for at least 30 minutes to crosslink the water-soluble thermally-crosslinkable hydrophilic polymeric material and the polyanionic polymer so as to form the colored contact lens, wherein the colored contact lens has a hydrogel coating covalently attached onto the layer of the polyanionic polymer, wherein the colored contact lens in fully hydrated state has a friction rating of about 2 or lower after 7 cycles of manual rubbing.

2. The method of claim 1, wherein said at least one hydroxyl-containing vinylic monomer is selected from the group consisting of hydroxyethyl (meth)acrylate, 2-hydroxypropyl (meth)acrylate, 3-hydroxypropyl (meth)acrylate, glycerol (meth)acrylate, N-2-hydroxyethyl (meth)acrylamide, N-2-hydroxypropyl (meth)acrylamide, N,N-bis(hydroxyethyl) (meth)acrylamide, N-2,3-dihydroxypropyl (meth)acrylamide, N-tris(hydroxymethyl)methyl (meth)acrylamide, vinyl alcohol, allyl alcohol, and combinations thereof.

3. The method of claim 1, wherein the non-silicone hydrogel lens body is obtained by polymerizing an aqueous lens-forming composition comprising a water-soluble, actinically-crosslinkable polyvinyl alcohol prepolymer which comprises:

at least 60% by mole of repeating units of vinyl alcohol;
from about 1% to about 25% by mole of repeating units of formula (I); and

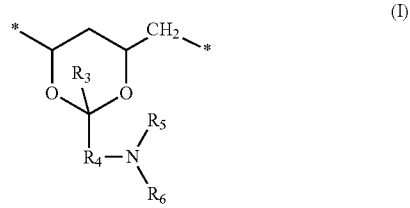

in which:
$R_3$ is hydrogen or a $C_1$-$C_6$ alkyl group;
$R_4$ is a $C_1$-$C_6$ alkylene divalent radical;
$R_5$ is hydrogen or $C_1$-$C_6$ alkyl;
$R_6$ is an ethylenically unsaturated group of

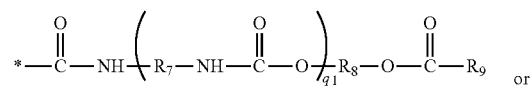 or

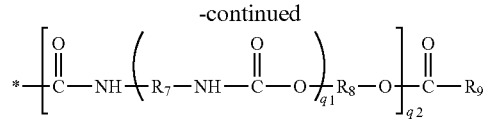

in which q1 and q2 independently of each another are zero or one, and $R_7$ and $R_8$ independently of one another are a $C_2$-$C_8$ alkylene divalent radical, $R_9$ is $C_2$-$C_8$ alkenyl.

4. The method of claim 1, wherein the preformed hydrogel contact lens is in contact with the first aqueous coating solution for a contacting time of at least one minute.

5. The method of claim 4, wherein the polyanionic polymer is poly(acrylic acid) (PAA), poly(methacrylic acid) (PMAA), poly(acrylic acid-co-methacrylic acid) (pAA-pMAA), poly(ethylacrylic acid) (PEAA), poly(acrylic acid-co-ethylacrylic acid) (pAA-pEAA), poly(methacrylic acid-co-ethylacrylic acid) (pMAA-pEAA), poly[2-acrylamidoglycolic acid], poly[2-methacrylamidoglycolic acid], or a combination thereof, wherein the polyanionic polymer has a weight average molecular weight of at least 100,000 Daltons.

6. The method of claim 5, wherein the water-soluble thermally-crosslinkable polymeric material comprises
(i) from about 20% to about 95% by weight of first polymer chains derived from a polyamidoamine-epichlorohydrin or a poly(2-oxazoline-co-ethyleneimine)-epichlorohydrin,
(ii) from about 5% to about 80% by weight of hydrophilic moieties and/or second polymer chains,
wherein each of the hydrophilic moieties is derived from at least one first hydrophilicity-enhancing agent which is a primary amine-containing monosaccharide, a secondary amine-containing monosaccharide, a carboxyl-containing monosaccharide, a thiol-containing monosaccharide, a primary amine-containing disaccharide, a secondary amine-containing disaccharide, a carboxyl-containing disaccharide, a thiol-containing disaccharide, a primary amine-containing oligosaccharide, a secondary amine-containing oligosaccharide, a carboxyl-containing oligosaccharide, a thiol-containing oligosaccharide, or a combination thereof, wherein the hydrophilic moieties are covalently attached to the first polymer chains through one or more covalent linkages each formed between one azetitdinium group of the polyamidoamine-epichlorohydrin and one amino, carboxyl or thiol group of the first hydrophilicity-enhancing agent, wherein each of the second polymer chains is derived from at least one second hydrophilicity-enhancing agent having at least one reactive functional group selected from the group consisting of primary amino group, secondary amino group, carboxyl group, thiol group, and combination thereof, wherein the second polymer chains are covalently attached to the first polymer chains through one or more covalent linkages each formed between one azetitdinium group of the polyamidoamine-epichlorohydrin and one amino, carboxyl or thiol group of the second hydrophilicity-enhancing agent, and
(iii) azetidinium groups which are parts of the first polymer chains or pendant or terminal groups covalently attached to the first polymer chains.

7. The method of claim 6, wherein the water-soluble thermally-crosslinkable polymeric material comprises from about 5% to about 80% by weight of the second polymer chains, wherein the second hydrophilicity-enhancing agent is:
a polyethylene glycol having one sole amino, carboxyl or thiol group; a polyethylene glycol with two terminal amino, carboxyl and/or thiol groups;
a multi-arm polyethylene glycol with one or more amino, carboxyl and/or thiol groups;
a polyethylene glycol dendrimer with one or more amino, carboxyl and/or thiol groups; a primary amine-containing polysaccharide;
a secondary amine-containing polysaccharide;
a carboxyl-containing polysaccharide;
hyaluronic acid;
chondroitin sulfate;
a copolymer which is a polymerization product of a composition comprising (1) about 60% or less by weight of one or more reactive vinylic monomers and (2) one or more non-reactive hydrophilic vinylic monomers, wherein said one or more reactive vinylic monomers are vinylic monomers having a carboxyl, primary amino, or secondary amino group, wherein said one or more non-reactive vinylic monomers are selected from the group consisting of a phosphorylcholine-containing vinylic monomer, (meth)acrylamide, N,N-dimethyl (meth)acrylamide, N-vinylpyrrolidone (NVP), N-vinyl formamide, N-vinyl acetamide, N-vinyl isopropylamide, N-vinyl-N-methyl acetamide, N,N-dimethylaminoethyl (meth)acrylate, N,N-dimethylaminopropyl (meth)acrylamide, glycerol (meth)acrylate, N-2-hydroxyethyl (meth)acrylamide, N-2-hydroxypropyl (meth)acrylamide, N-3-hydroxypropyl (meth)acrylamide, N,N-bis(hydroxyethyl) (meth)acrylamide, N-2,3-dihydroxypropyl (meth)acrylamide, N-tris(hydroxymethyl)methyl (meth)acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, $C_1$-$C_4$-alkoxy polyethylene glycol (meth)acrylate having a weight average molecular weight of up to 1500 Daltons, allyl alcohol, vinyl alcohol, and combinations thereof; or
a combination thereof.

8. The method of claim 7, wherein the step of heating is performed by autoclaving the colored contact lens precursor immersed in the second aqueous coating solution in a sealed lens package at a temperature of from about 115° C. to about 125° C. for about 30 minutes to about 90 minutes, wherein the second aqueous coating solution is a buffered aqueous solution with a pH of from 6.7 to 7.6.

9. A colored contact lens, comprising: a hydrogel lens body having an opaque color image thereon and/or therein; and a coating which encloses the hydrogel lens body and the opaque color image, wherein the hydrogel lens body is a non-silicone hydrogel lens body which is composed of a polymer comprising at least 50% by mole of repeating units of at least one hydroxyl-containing vinylic monomer, wherein the opaque color image is a cosmetic pattern, wherein the coating comprises an anchoring layer of a polyanionic polymer and a layer of a hydrogel material, wherein the polyanionic polymer is one or more homo- or copolymers of acrylic acid, methacrylic acid, ethylacrylic acid, 2-acrylamidoglycolic acid, or 2-methacrylamidoglycolic acid, wherein the hydrogel material is derived from a hydrophilic polymeric material having azetidinium groups and is covalently attached onto the anchoring layer of the polyanionic polymer through linkages each formed between one carboxyl group and one azetidinium group, wherein the colored contact lens in fully hydrated state has a friction rating of about 2 or lower after 7 cycles of manual rubbing.

10. The colored contact lens of claim 9, wherein said at least one hydroxyl-containing vinylic monomer is selected from the group consisting of hydroxyethyl (meth)acrylate, 2-hydroxypropyl (meth)acrylate, 3-hydroxypropyl (meth)acrylate, glycerol (meth)acrylate, N-2-hydroxyethyl (meth)acrylamide, N-2-hydroxypropyl (meth)acrylamide, N-3-hydroxypropyl (meth)acrylamide, N,N-bis(hydroxyethyl) (meth)acrylamide, N-2,3-dihydroxypropyl (meth)acrylamide, N-tris(hydroxymethyl)methyl (meth)acrylamide, vinyl alcohol, allyl alcohol, and combinations thereof.

11. The colored contact lens of claim 9, wherein the non-silicone hydrogel lens body is composed of a crosslinked product of a water-soluble, actinically-crosslinkable polyvinyl alcohol prepolymer which comprises:
at least 60% by mole of repeating units of vinyl alcohol;
repeating units of formula (I); and

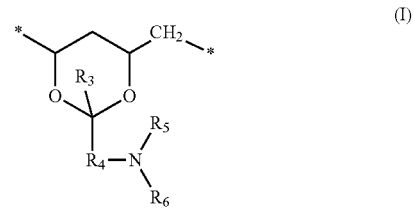

in which:
$R_3$ is hydrogen or a $C_1$-$C_6$ alkyl group;
$R_4$ is a $C_1$-$C_6$ alkylene divalent radical;
$R_5$ is hydrogen or $C_1$-$C_6$ alkyl;
$R_6$ is an ethylenically unsaturated group of

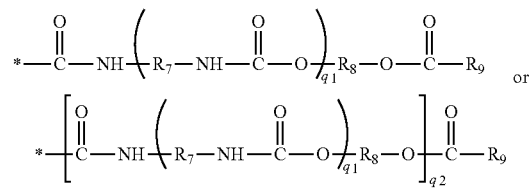

in which q1 and q2 independently of each another are zero or one, and $R_7$ and $R_8$ independently of one another are a $C_2$-$C_8$ alkylene divalent radical, $R_9$ is $C_2$-$C_8$ alkenyl.

12. The colored contact lens of claim 9, wherein the polyanionic polymer is poly(acrylic acid) (PAA), poly(methacrylic acid) (PMAA), poly(acrylic acid-co-methacrylic acid) (pAA-pMAA), poly(ethylacrylic acid) (PEAA), poly(acrylic acid-co-ethylacrylic acid) (pAA-pEAA), poly(methacrylic acid-co-ethylacrylic acid) (pMAA-pEAA), poly[2-acrylamidoglycolic acid], poly[2-methacrylamidoglycolic acid], or a combination thereof.

13. The colored contact lens of claim 12, wherein the hydrophilic polymeric material comprises
(i) from about 20% to about 95% by weight of first polymer chains derived from a polyamidoamine-epichlorohydrin or a poly(2-oxazoline-co-ethyleneimine)-epichlorohydrin,
(ii) from about 5% to about 80% by weight of hydrophilic moieties and/or second polymer chains, wherein each of the hydrophilic moieties is derived from at least one first hydrophilicity-enhancing agent which is a primary amine-containing monosaccharide, a secondary amine-containing monosaccharide, a carboxyl-containing monosaccharide, a thiol-containing monosaccharide, a primary amine-containing disaccharide, a secondary amine-containing disaccharide, a carboxyl-containing disaccharide, a thiol-containing disaccharide, a primary amine-containing oligosaccharide, a secondary amine-containing oligosaccharide, a carboxyl-containing oligosaccharide, a thiol-containing oligosaccharide, or a combination thereof, wherein the hydrophilic moieties are covalently attached to the first polymer chains through one or more covalent linkages each formed between one azetitdinium group of the polyamidoamine-epichlorohydrin and one amino, carboxyl or thiol group of the first hydrophilicity-enhancing agent, wherein each of the second polymer chains is derived from at least one second hydrophilicity-enhancing agent having at least one reactive functional group selected from the group consisting of primary amino group, secondary amino group, carboxyl group, thiol group, and combination thereof, wherein the second polymer chains are covalently attached to the first polymer chains through one or more covalent linkages each formed between one azetitdinium group of the polyamidoamine-epichlorohydrin and one amino, carboxyl or thiol group of the second hydrophilicity-enhancing agent, and (iii) azetidinium groups which are parts of the first polymer chains or pendant or terminal groups covalently attached to the first polymer chains.

14. The colored contact lens of claim 13, wherein the water-soluble thermally-crosslinkable polymeric material comprises from about 5% to about 80% by weight of the second polymer chains, wherein the second hydrophilicity-enhancing agent is:

a polyethylene glycol having one sole amino, carboxyl or thiol group; a polyethylene glycol with two terminal amino, carboxyl and/or thiol groups;

a multi-arm polyethylene glycol with one or more amino, carboxyl and/or thiol groups;

a polyethylene glycol dendrimer with one or more amino, carboxyl and/or thiol groups; a primary amine-containing polysaccharide;

a secondary amine-containing polysaccharide;

a carboxyl-containing polysaccharide;

hyaluronic acid;

chondroitin sulfate;

a copolymer which is a polymerization product of a composition comprising (1) about 60% or less by weight of one or more reactive vinylic monomers and (2) one or more non-reactive hydrophilic vinylic monomers, wherein said one or more reactive vinylic monomers are vinylic monomers having a carboxyl, primary amino, or secondary amino group, wherein said one or more non-reactive vinylic monomers are selected from the group consisting of a phosphorylcholine-containing vinylic monomer, (meth)acrylamide, N,N-dimethyl (meth)acrylamide, N-vinylpyrrolidone (NVP), N-vinyl formamide, N-vinyl acetamide, N-vinyl isopropylamide, N-vinyl-N-methyl acetamide, N,N-dimethylaminoethyl (meth)acrylate, N,N-dimethylaminopropyl (meth)acrylamide, glycerol (meth)acrylate, N-2-hydroxyethyl (meth)acrylamide, N-2-hydroxypropyl (meth)acrylamide, N-3-hydroxypropyl (meth)acrylamide, N,N-bis(hydroxyethyl) (meth)acrylamide, N-2,3-dihydroxypropyl (meth)acrylamide, N-tris(hydroxymethyl)methyl (meth)acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, $C_1$-$C_4$-alkoxy polyethylene glycol (meth)acrylate having a weight average molecular weight of up to 1500 Daltons, allyl alcohol, vinyl alcohol, and combinations thereof; or a combination thereof.

15. The colored contact lens of claim 14, wherein the colored contact lens has a water content of from about 15% to about 80% by weight (at room temperature, about 22° C. to 28° C.) and/or an elastic modulus of from about 0.2 MPa to about 1.5 MPa when being fully hydrated.

16. The colored contact lens of claim 15, wherein the coating has a thickness of at least 0.1 μm.

* * * * *